United States Patent
Suzuki et al.

(10) Patent No.: US 10,593,980 B2
(45) Date of Patent: Mar. 17, 2020

(54) IONOMER RESIN, AND IONOMER SOLUTION, MULTILAYER BODY, MEMBER, ELECTROCHEMICAL ELEMENT, AND ELECTROCHEMICAL DEVICE THAT INCLUDE THE SAME

(71) Applicant: NITTO DENKO CORPORATION, Ibaraki-shi, Osaka (JP)

(72) Inventors: Takashi Suzuki, Osaka (JP); Hiroyuki Nishii, Osaka (JP); Koso Matsuda, Osaka (JP); Mizuki Yamamoto, Osaka (JP); Takeshi Nakano, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/557,302

(22) PCT Filed: Mar. 11, 2016

(86) PCT No.: PCT/JP2016/001408
§ 371 (c)(1),
(2) Date: Sep. 11, 2017

(87) PCT Pub. No.: WO2016/147641
PCT Pub. Date: Sep. 22, 2016

(65) Prior Publication Data
US 2018/0053943 A1 Feb. 22, 2018

(30) Foreign Application Priority Data

Mar. 13, 2015 (JP) ................................. 2015-051418
Mar. 13, 2015 (JP) ................................. 2015-051419
Mar. 13, 2015 (JP) ................................. 2015-051421

(51) Int. Cl.
| | |
|---|---|
| H01M 8/1018 | (2016.01) |
| H01M 8/1053 | (2016.01) |
| H01M 8/1004 | (2016.01) |
| H01M 8/1023 | (2016.01) |
| H01M 4/86 | (2006.01) |
| H01M 4/88 | (2006.01) |
| H01B 1/12 | (2006.01) |
| H01B 1/20 | (2006.01) |
| C08F 8/00 | (2006.01) |

(Continued)

(52) U.S. Cl.
CPC .......... *H01M 8/1018* (2013.01); *B32B 27/30* (2013.01); *C08F 8/00* (2013.01); *C08F 8/24* (2013.01); *C08F 112/14* (2013.01); *C08F 212/08* (2013.01); *H01B 1/12* (2013.01); *H01B 1/20* (2013.01); *H01M 4/86* (2013.01); *H01M 4/8668* (2013.01); *H01M 4/88* (2013.01); *H01M 8/1004* (2013.01); *H01M 8/1023* (2013.01); *H01M 8/1053* (2013.01); *B32B 2457/18* (2013.01); *H01M 4/881* (2013.01); *H01M 4/8807* (2013.01); *H01M 4/8814* (2013.01); *H01M 2008/1095* (2013.01); *H01M 2300/0082* (2013.01); *H01M 2300/0094* (2013.01)

(58) Field of Classification Search
None
See application file for complete search history.

(56) References Cited

U.S. PATENT DOCUMENTS

| | | |
|---|---|---|
| 5,518,627 A | 5/1996 | Tomoi et al. |
| 2007/0213490 A1 | 9/2007 | Yamamoto et al. |

(Continued)

FOREIGN PATENT DOCUMENTS

| | | | |
|---|---|---|---|
| JP | S5350289 A | 5/1978 | |
| JP | H107289923 A | 11/1995 | |

(Continued)

OTHER PUBLICATIONS

Chemical Abstract for JP2009-227728—Accession No. 2009:1235117 (2009). (Year: 2009).*

(Continued)

*Primary Examiner* — Sin J Lee
(74) *Attorney, Agent, or Firm* — Hamre, Schumann, Mueller & Larson, P.C.

(57) ABSTRACT

Provided is an ionomer resin including a copolymer containing the following first structural unit.

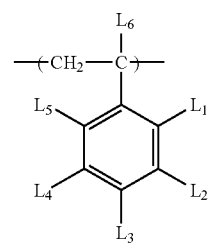

$L_1$ to $L_5$ are each independently a hydrogen atom, an alkyl group having 1 to 4 carbon atoms, an alkanol group having 1 to 4 carbon atoms, or a specific functional group including an anion-exchange group, and an example of the functional group is $-Z_2-M_1-Z_1(R_1)(R_2)(R_3)$. $R_1$ to $R_3$ are directly bonded to $Z_1$ and are each independently an alkyl group having 1 to 8 carbon atoms or an alkanol group having 1 to 8 carbon atoms. $M_1$ is a linear hydrocarbon chain having 3 to 8 carbon atoms, $Z_1$ is a nitrogen atom or a phosphorus atom, and $Z_2$ is a nitrogen atom bonded to one hydrogen atom, an oxygen atom, or a sulfur atom. $L_6$ is a hydrogen atom, a methyl group, or an ethyl group.

11 Claims, 2 Drawing Sheets

(51) Int. Cl.
    *C08F 8/24*     (2006.01)
    *C08F 112/14*     (2006.01)
    *C08F 212/08*     (2006.01)
    *B32B 27/30*     (2006.01)

(56) References Cited

U.S. PATENT DOCUMENTS

| | | | |
|---|---|---|---|
| 2008/0087604 A1 | 4/2008 | Vanhoorne et al. | |
| 2014/0370417 A1 | 12/2014 | Matsuda et al. | |

FOREIGN PATENT DOCUMENTS

| | | | |
|---|---|---|---|
| JP | 2007262389 A | 10/2007 | |
| JP | 2008080333 A | 4/2008 | |
| JP | 2009140783 A | 6/2009 | |
| JP | 2009227728 A | 10/2009 | |
| JP | 2014044940 A | 3/2014 | |
| WO | 2015166650 A1 | 11/2015 | |

OTHER PUBLICATIONS

Machine-assisted English translation for JP2009-227728 provided by JPO (2009). (Year: 2009).*
English abstract for WO 2015/166650 A1 (Year: 2015).*
English translation for WO 2015/166650 A1 (Year: 2015).*
International Search Report for PCT/JP2016/001408, dated May 24, 2016, 5 pages including English translation.
Extended European Search Report issued for European Patent Application No. 16764472.3, dated Jul. 17, 2018, 10 pages.

* cited by examiner

IONOMER RESIN, AND IONOMER SOLUTION, MULTILAYER BODY, MEMBER, ELECTROCHEMICAL ELEMENT, AND ELECTROCHEMICAL DEVICE THAT INCLUDE THE SAME

TECHNICAL FIELD

The present invention relates to: an ionomer resin having an anion-exchange group and suitable for use in an electrochemical device; a material including the ionomer resin and used for forming an electrochemical device; and an electrochemical device.

BACKGROUND ART

Known examples of electrochemical devices, which provide electrical energy through a chemical reaction or which cause a chemical reaction upon input of electrical energy, include various batteries and hydrogen production devices. Polymer electrolyte fuel cells (PEFCs), which are a type of electrochemical device, have the advantage of being operable in a temperature range around ordinary temperature and are promising for use in various fields. Among PEFCs, anion-exchange fuel cells can be more cost-effective since they do not require the use of platinum in an electrode catalyst. As the fuel of an anion-exchange fuel cell there can be used an alcohol-based or hydrazine hydrate-based liquid fuel which is easier to handle than hydrogen and permits reduction in size of the fuel cell system. In particular, hydrazine hydrate is highly reactive and, according to the electricity generation principle, does not produce carbon dioxide. For these reasons, studies employing hydrazine hydrate have been pursued.

Generally, in a PEFC, a cathode catalyst layer is disposed on one side of an electrolyte membrane, and an anode catalyst layer is disposed on the other side of the electrolyte membrane. Such catalyst layers, which may be needed in electrochemical devices, contain an ionomer resin and an electrode catalyst. A typical ionomer resin used in anion-exchange PEFCs is one that has a structure (such as a benzyltrialkylammonium structure) in which an anion-exchange group (a functional group having anionic conductivity) such as a quaternary ammonium group is bonded to a benzene ring via a methylene group (see Patent Literature 1, for example).

The term "ionomer resin" as used herein refers to a resin including an organic compound such as an ion-conductive polymer material, and the term "ionomer solution" as used herein refers to a solution of an ionomer resin dissolved in a solvent.

CITATION LIST

Patent Literature

Patent Literature 1: JP 2014-044940 A

SUMMARY OF INVENTION

Technical Problem

An electrochemical device of the anion exchange type, such as an anion-exchange PEFC, makes use of the migration of anions (OH⁻) resulting from oxidation-reduction reaction at the cathode, and the internal environment of the electrochemical device is alkaline. A resin such as an ionomer resin which is used as an anion-exchange resin in such an electrochemical device is therefore required to be resistant to decomposition in an alkaline environment.

However, ionomer resins having a benzyltrialkylammonium structure are by no means chemically stable. This is because, in an alkaline environment, the benzyltrialkylammonium structure is prone to undergo a reaction such as nucleophilic substitution reaction involving hydroxide ions. For example, a trialkylamine or methyl group is likely to be eliminated from the benzyltrimethylammonium structure in an alkaline environment.

An object of the present invention to provide an ionomer resin having high alkali resistance. Another object of the present invention to provide an ionomer solution, a multilayer body, a member, an electrochemical element, and an electrochemical device that include the ionomer resin.

Solution to Problem

The present invention provides an ionomer resin including a copolymer containing a first structural unit represented by the formula (1) shown below.

In the formula (1), $L_1$ to $L_5$ are each independently a hydrogen atom, an alkyl group having 1 to 4 carbon atoms, an alkanol group having 1 to 4 carbon atoms, or a structure represented by the formula (2-1) or (2-2) shown below, at least one of $L_1$ to $L_5$ is a structure represented by the formula (2-1) or (2-2), and $L_6$ is a hydrogen atom, a methyl group, or an ethyl group.

In the formulae (2-1) and (2-2), $R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms, $M_1$, $M_{11}$, and $M_{21}$ are each independently a linear hydrocarbon chain having 3 to 8 carbon atoms, the hydrocarbon chain may have a substituent replacing a hydrogen atom bonded to a carbon atom of the hydrocarbon chain, the substituent is at least one selected from the group consisting of a halogen atom and an alkyl group having 1 to 5 carbon atoms, $Z_1$, $Z_{11}$, and $Z_{21}$ are each independently a nitrogen atom or a phosphorus atom, $Z_2$ is a nitrogen atom bonded to one hydrogen atom, an oxygen atom, or a sulfur atom, and $Z_{12}$ is a nitrogen atom.

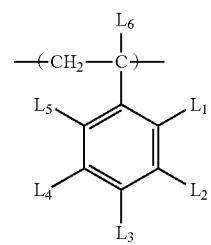

(1)

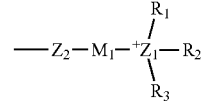

(2-1)

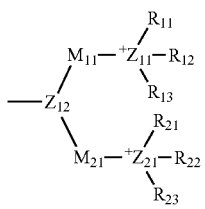

(2-2)

The present invention provides an ionomer solution including the ionomer resin according to the present invention and a solvent.

In another aspect, the present invention provides a multilayer body including two or more layers, wherein the layers include a first layer containing the ionomer resin according to the present invention.

The multilayer body may be a multilayer body (multilayer body A) in which the two or more layers include a second layer, the second layer has an anion-exchange polymer electrolyte membrane, and the first layer is stacked on the second layer.

The multilayer body may be a multilayer body (multilayer body B) in which the two or more layers include a catalyst layer, and the first layer is stacked on the catalyst layer.

The present invention provides a member for an electrochemical element, the member including the multilayer body B according to the present invention and a base material, wherein the base material, the catalyst layer, and the first layer are stacked in this order.

The present invention provides an electrochemical element (electrochemical element A) including an anion-exchange polymer electrolyte membrane and an electrode, wherein a principal surface of the anion-exchange polymer electrolyte membrane is in contact with a principal surface of the electrode, and the electrode contains the resin according to the present invention.

In another aspect, the present invention provides an electrochemical element (electrochemical element B) including an anode, a cathode, and a multilayer body including an anion-exchange polymer electrolyte membrane, wherein the multilayer body is the multilayer body A according to the present invention, and the multilayer body A is sandwiched between the anode and the cathode.

In still another aspect, the present invention provides an electrochemical device including the electrochemical element A according to the present invention.

In another aspect, the present invention provides an electrochemical device including the electrochemical element B according to the present invention.

Advantageous Effects of Invention

The present invention can provide an ionomer resin that is less likely to suffer a decrease in ionic conductivity even when used in an alkaline environment. The present invention can provide an ionomer solution that exploits the properties of such an ionomer resin. The present invention can provide a multilayer body, a member, and an electrochemical element that exploit the properties of the ionomer resin according to the present invention. The present invention can further provide an electrochemical device that exploits the properties of the ionomer resin according to the present invention.

DESCRIPTION OF EMBODIMENTS

Figure 1:
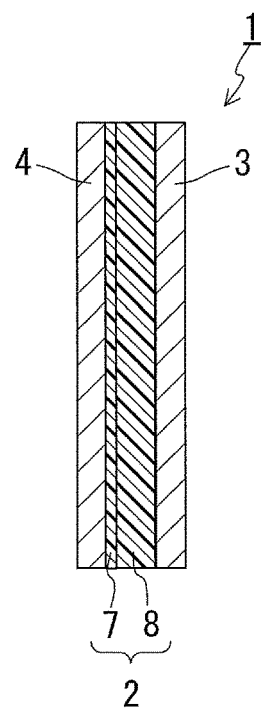
FIG. 1 is a cross-sectional view schematically showing an exemplary membrane-electrode assembly (MEA) which is a preferred example of the electrochemical element according to the present invention.

Hereinafter, embodiments of the present invention will be described with reference to examples. The present invention is not limited to the examples described below. For instance, although a PEFC is described below as an exemplary electrochemical device, the present invention is applicable also to electrochemical devices other than PEFCs, including: electrolysis devices such as a hydrogen production device; salt production devices; and water purification devices. The present invention is also applicable to electrochemical elements other than MEAs, although a MEA is described below as an exemplary electrochemical element.

[Ionomer Resin and Method for Producing Copolymer Included in the Ionomer Resin]

(Ionomer Resin)

An ionomer resin according to the present embodiment includes a copolymer containing a first structural unit represented by the following formula (1).

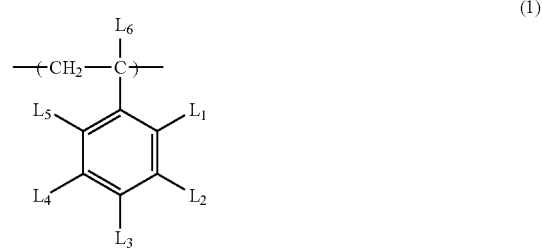

(1)

In the formula (1), $L_1$ to $L_5$ are each independently a hydrogen atom, an alkyl group having 1 to 4 carbon atoms, an alkanol group having 1 to 4 carbon atoms, or a structure represented by the formula (2-1) or (2-2) shown below, and at least one of $L_1$ to $L_5$ is a structure represented by the formula (2-1) or (2-2) shown below. Examples of the alkyl group having 1 to 4 carbon atoms include methyl, ethyl, n-propyl, iso-propyl, n-butyl, iso-butyl, sec-butyl, and tert-butyl groups. The alkyl group having 1 to 4 carbon atoms is preferably at least one of a methyl, ethyl, n-propyl, and n-butyl group. Examples of the alkanol group having 1 to 4 carbon atoms include hydroxymethyl, hydroxyethyl, 3-hydroxypropyl, and 4-hydroxybutyl groups. The term "alkanol group" as used herein refers to a structure resulting from substitution of a hydroxyl group for at least one hydrogen atom of an alkyl group. Preferably, $L_1$ to $L_5$ are each independently a hydrogen atom or a structure represented by the formula (2-1), and any one of $L_1$ to $L_5$ is a structure represented by the formula (2-1). In the first structural unit represented by the formula (1), the structure represented by the formula (2-1) or formula (2-2) may be present at any of the ortho-, meta-, and para-positions and is more preferably present at the para-position.

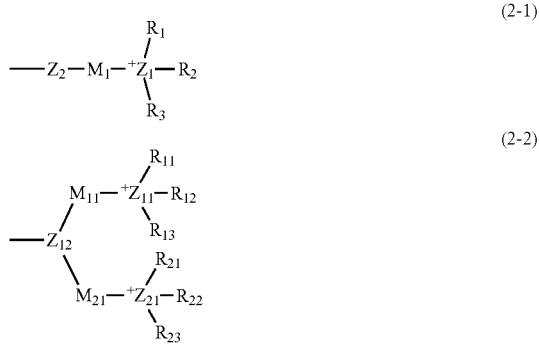

In the formulae (2-1) and (2-2), $R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms. Preferably, $R_1$ to $R_3$, $R_{11}$ to $R_{13}$, and $R_{21}$ to $R_{23}$ are each independently an alkyl group having 1 to 6 carbon atoms or an alkanol group having 1 to 6 carbon atoms. More preferably, $R_1$ to $R_3$, $R_{11}$ to $R_{13}$, and $R_{21}$ to $R_{23}$ are each independently an alkyl group having 1 to 4 carbon atoms or an alkanol group having 1 to 4 carbon atoms. Examples of the alkyl group having 1 to 8 carbon atoms include the above-mentioned alkyl groups having 1 to 4 carbon atoms and further include 1-methylbutyl, n-pentyl, n-hexyl, n-heptyl, and n-octyl groups. Examples of the alkanol group having 1 to 8 carbon atoms include the above-mentioned alkanol groups having 1 to 4 carbon atoms and further include 5-hydroxypentyl, 6-hydroxyhexyl, 7-hydroxyheptyl, and 8-hydroxyoctyl groups.

$L_6$ is a hydrogen atom, a methyl group, or an ethyl group. $L_6$ is preferably a hydrogen atom.

$M_1$, $M_{11}$, and $M_{21}$ are each independently a linear hydrocarbon chain having 3 to 8 carbon atoms and optionally having a substituent replacing a hydrogen atom. $M_1$, $M_{11}$, and $M_{21}$ may each independently be a linear alkylene group having 3 to 8 carbon atoms and optionally having a substituent replacing a hydrogen atom. The number of carbon atoms constituting the hydrocarbon chain is more preferably 3 to 6. The substituent replacing a hydrogen atom is at least one selected from the group consisting of a halogen atom and an alkyl group having 1 to 5 carbon atoms. The halogen atom is, for example, a chlorine, bromine, or iodine atom. Examples of the alkyl group having 1 to 5 carbon atoms include methyl, ethyl, n-propyl, iso-propyl, n-butyl, iso-butyl, sec-butyl, tert-butyl, n-pentyl, 1-methylbutyl, 2-methylbutyl, 3-methylbutyl, 1,1-dimethylpropyl, 1,2-dimethylpropyl, and 2,2-dimethylpropyl groups. The substituent is preferably a methyl group and/or an ethyl group. When the hydrocarbon chain has a plurality of substituents, the substituents may be the same as or different from each other.

$Z_1$, $Z_{11}$, and $Z_{21}$ are each independently a nitrogen atom or a phosphorus atom. $Z_1$, $Z_{11}$, and $Z_{21}$ are preferably each a nitrogen atom.

$Z_2$ is a nitrogen atom bonded to one hydrogen atom (NH), an oxygen atom (O), or a sulfur atom (S). $Z_2$ is preferably an oxygen atom. $Z_{12}$ is a nitrogen atom (N).

In the first structural unit contained in the copolymer included in the ionomer resin according to the present embodiment, an anion-exchange group is bonded to the benzene ring via a hydrocarbon chain denoted by $M_1$, $M_{11}$, or $M_{21}$ (such as an alkylene group) which optionally has a substituent replacing a hydrogen atom and via a heteroatom denoted by $Z_2$ or $Z_{12}$ (such as an oxygen atom). The first structural unit has a heteroatom denoted by $Z_2$ or $Z_{12}$ which is bonded to the benzene ring and, in the first structural unit, the anion-exchange group is bonded to the benzene ring via an ether, thioether, or amine structure containing the heteroatom. Elimination of the anion-exchange group from such a first structural unit is less likely to occur. The ionomer resin according to the present embodiment which includes a copolymer containing the first structural unit is less likely to suffer elimination of the anion-exchange group and has an improved alkali resistance. The use of the ionomer resin according to the present embodiment reduces the occurrence of problems such as generation of amine odor or dissolved matter due to elimination of the anion-exchange group.

A specific example of the first structural unit is a structure represented by the formula (10) shown below. In the formula (10), n is preferably an integer of 3 to 8 and more preferably an integer of 3 to 6. $R_1$ to $R_3$ are bonded directly to the nitrogen atom. Preferably, $R_1$ to $R_3$ are each independently an alkyl group having 1 to 4 carbon atoms or an alkanol group having 1 to 4 carbon atoms. A preferred example of the first structural unit is a structure of the formula (10) in which $R_1$ and $R_2$ are each a methyl group, $R_3$ is a butyl group, and n is 4.

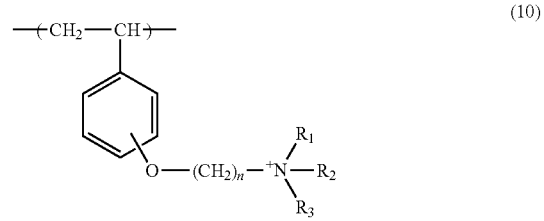

A counter anion $Y_2$ of the ionomer resin according to the present embodiment is, for example, a hydroxide, carbonate, bicarbonate, or halide ion. Examples of the halide ion include fluoride, chloride, bromide, and iodide ions.

The copolymer included in the ionomer resin according to the present embodiment contains, in addition to the first structural unit, a second structural unit different from the first structural unit.

The second structural unit preferably has a structure derived from at least one selected from second monomers described below. When at least one selected from the group consisting of styrene and styrene-derivative monomers is used as a second monomer, the second structural unit has a structure represented by the following formula (3).

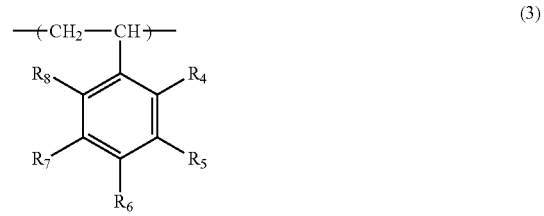

In the formula (3), $R_4$ to $R_8$ are each independently a hydrogen atom, a halogen atom, an alkyl or alkoxy group having 1 to 14 carbon atoms, or a halogenated alkyl group having 1 to 4 carbon atoms. Preferably, $R_4$ to $R_8$ are each independently a hydrogen atom, or an alkyl or alkoxy group having 1 to 14 carbon atoms. The number of carbon atoms in the alkyl or alkoxy group is more preferably in the range of 1 to 4.

In the copolymer included in the ionomer resin according to the present embodiment, the number of moles of the first structural unit is preferably in the range of 0.01 to 0.7 times the sum of the number of moles of the first structural unit and the number of moles of the second structural unit and may be in the range of 0.01 to 0.5 times the sum. The number of moles of the first structural unit is more preferably in the range of 0.05 to 0.7 times, even more preferably 0.1 to 0.5 times, still even more preferably 0.1 to 0.4 times, particularly preferably 0.1 to 0.3 times, the sum of the number of moles of the first structural unit and the number of moles of the second structural unit. The numbers of moles of the structural units can be calculated, for example, from measured values obtained by proton nuclear magnetic resonance ($^1$H NMR). An example of the method of calculation is one described in EXAMPLES below. In order for an ionomer resin to have a high ionic conductivity, it is necessary for its ion-exchange capacity to be high. To this end, it is preferable that the ionomer resin have a high content of the first structural unit having an ion-exchange group. However, if the content of the first structural unit in a copolymer is excessively high, the solubility of the copolymer in water may be increased, and thus the copolymer may be unusable as an ionomer resin. The ionomer resin according to the present embodiment has high ionic conductivity and high alkali resistance by virtue of including a copolymer in which the ratio of the number of moles of the first structural unit is within the range as indicated above, and is therefore suitable as an ionomer resin for use in PEFCs.

In an electrode of a PEFC, an ionomer resin and an electrode catalyst are required to be uniformly dispersed. Thus, the electrode is generally formed by spray coating or spread coating with a catalyst electrode composition prepared by dissolving an ionomer resin in an organic solvent and further dispersing an electrode catalyst in the resulting solution. The ionomer resin is preferably soluble in organic solvents. The solubility of the copolymer included in the ionomer resin according to the present embodiment is preferably such that 0.5 g or more of the copolymer can be dissolved in 100 g of ethanol at 25° C. Whether a resin or a copolymer is soluble may be determined on the basis of whether a precipitate can be visually observed, since there is no practical problem unless any precipitate is visually observable.

The copolymer included in the ionomer resin according to the present embodiment is preferably devoid of a crosslinked structure. If the copolymer has a crosslinked structure, the ionomer resin may be insoluble in organic solvents.

Ionomer resins may, when used in fuel cells, have contact with water resulting from reaction in the fuel cells or water supplied to the fuel cells. Ionomer resins are polymer materials having an ion-exchange group and, when used in PEFCs, perform the function of transporting the conducting ionic species within the PEFCs. To maintain the function of a PEFC and prevent the performance degradation of the PEFC, it is preferable that the ionomer resin used not be easily dissolved by contact with water. It is therefore preferable that the ionomer resin according to the present embodiment be insoluble in water. Being "insoluble in water" means herein that the amount of the ionomer resin soluble in 100 g of water at 25° C. is less than 0.1 g, in particular less than 0.01 g.

In anion-exchange fuel cells, the conducting ionic species is hydroxide ion, and the ionomer resin used is exposed to an alkaline environment. It is therefore preferable that the ionomer resin according to the present embodiment be insoluble in alkaline aqueous solutions. For example, the amount of the ionomer resin soluble in 100 g of an aqueous potassium hydroxide solution containing 5.31 wt % of potassium hydroxide at 25° C. is less than 0.1 g, in particular less than 0.01 g.

An ionomer solution including the ionomer resin according to the present embodiment and a solvent can be prepared into a catalyst electrode composition by adding an electrode catalyst to the ionomer solution. The ionomer resin according to the present embodiment can contribute to improvement in the dispersibility of an electrode catalyst contained in a catalyst electrode composition. In the ionomer resin according to the present embodiment, a heteroatom denoted by $Z_2$ or $Z_{12}$ (such as an oxygen atom) is bonded to the benzene ring, and a hydrocarbon chain denoted by $M_1$, $M_{11}$, or $M_{21}$ (such as a linear alkylene group having 3 to 6 carbon atoms) is bonded to this heteroatom. Having such a structure is believed to permit a quaternary ammonium group having a high polarity to spatially move away from the polymer main chain having a low polarity and readily coordinate to the catalyst. Thus, the ionomer resin according to the present embodiment is suitable for improving the dispersibility of an electrode catalyst in a catalyst electrode composition.

(Method for Producing Ionomer Resin)

Next, a method for producing an ionomer resin will be described. In an example, the production method includes a step (iii) of producing a first structural unit represented by the formula (1) from a structural unit represented by formula (4) using a copolymer B having the structural unit represented by the formula (4). The step (iii) includes a step (iii-a) of reacting a structural unit represented by the formula (4) with a compound represented by formula (5) shown below to produce a copolymer having a first structural unit represented by the formula (1) or a step (iii-b) of reacting a structural unit represented by the formula (4) with a compound represented by formula (6) and subsequently reacting the resulting reaction product with a compound represented by formula (7) to produce a first structural unit represented by the formula (1).

The first structural unit represented by the formula (1), the structure represented by the formula (2-1), the structure represented by the formula (2-2), $L_1$ to $L_6$, $R_1$ to $R_3$, $M_1$, and $Z_1$ are as previously described and will therefore not be described again. $X_1$ to $X_3$ are each independently a chlorine, bromine, or iodine atom, and $Y_1$ is a hydroxide, carbonate, bicarbonate, or halide ion.

$L_{11}$ to $L_{15}$ are each independently a hydrogen atom, an alkyl group having 1 to 4 carbon atoms, an alkanol group having 1 to 4 carbon atoms, $NH_2$, OH, or SH, and at least one of $L_{11}$ to $L_{15}$ is at least one selected from the group consisting of $NH_2$, OH, and SH. The alkyl group having 1 to 4 carbon atoms and the alkanol group having 1 to 4 carbon atoms are as previously described and will therefore not be described again. Preferably, $L_{11}$ to $L_{15}$ are each independently a hydrogen atom, $NH_2$, OH, or SH, and any one of $L_{11}$ to $L_{15}$ is at least one selected from the group consisting of $NH_2$, OH, and SH. More preferably, $L_{11}$ to $L_{15}$ are each independently a hydrogen atom or OH, and any one of $L_{11}$ to $L_{15}$ is OH.

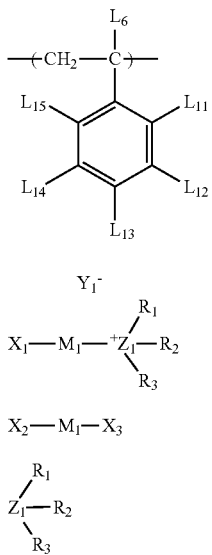

(4)

(5)

(6)

(7)

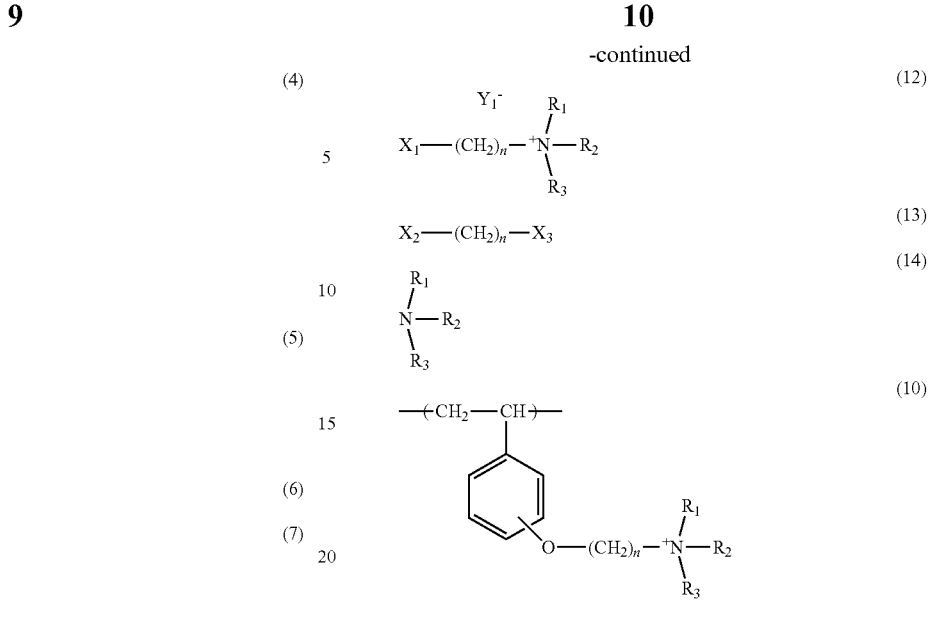

When any one of $L_{11}$ to $L_{15}$ is $NH_2$, the proportions of the structures of the formulae (2-1) and (2-2) to be obtained can be adjusted depending on the ratio of the number of moles of the compound represented by the formula (5) to the number of moles of nitrogen contained in the structural unit represented by the formula (4). For example, when the above ratio between the numbers of moles is in the range of 1.1 to 2.0 in the step (iii-a), a reaction product having a high proportion of the structure represented by the formula (2-1) is obtained. Similarly, in the step (iii-b), the proportions of the structures of the formulae (2-1) and (2-2) to be obtained can be adjusted depending on the ratio of the number of moles of the compound represented by the formula (6) to the number of moles of nitrogen contained in the structural unit represented by the formula (4).

In an example of the step (iii), a structural unit represented by the formula (10) is produced from a structural unit represented by formula (11) shown below using a copolymer B having the structural unit represented by the formula (11). The step (iii-a) is, for example, a step of reacting a structural unit represented by the formula (11) with a haloalkyltrialkylammonium represented by formula (12) to produce a copolymer having a structural unit represented by the formula (10). The step (iii-b) is, for example, a step of reacting a structural unit represented by the formula (11) with a dihaloalkane represented by formula (13) and subsequently reacting the resulting reaction product with a trialkylamine represented by formula (14) to produce a structural unit represented by the formula (10). $R_1$ to $R_3$, $X_1$ to $X_3$, $Y_1$, and n are as previously described and will therefore not be described again.

(11)

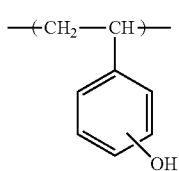

The term "haloalkyltrialkylammonium" as used herein refers to a compound represented by the formula (12). Specific examples of the haloalkyltrialkylammonium include halopropyltrimethylammonium, halobutyltrimethylammonium, halopentyltrimethylammonium, halohexyltrimethylammonium, halopropylethyldimethylammonium, halobutylethyldimethylammonium, halopentylethyldimethylammonium, halohexylethyldimethylammonium, halopropyldimethylpropylammonium, halobutyldimethylpropylammonium, halopentyldimethylpropylammonium, halohexyldimethylpropylammonium, halopropyldimethylbutylammonium, halobutyldimethylbutylammonium, halopentyldimethylbutylammonium, halohexyldimethylbutylammonium, halopropyldiethylmethylammonium, halobutyldiethylmethylammonium, halopentyldiethylmethylammonium, halohexyldiethylmethylammonium, halopropylethylmethylpropylammonium, halobutylethylmethylpropylammonium, halopentylethylmethylpropylammonium, halohexylethylmethylpropylammonium, halopropylbutylethylmethylammonium, halobutylbutylethylmethylammonium, halopentylbutylethylmethylammonium, halohexylbutylethylmethylammonium, halopropylmethyldipropylammonium, halobutylmethyldipropylammonium, halopentylmethyldipropylammonium, halohexylmethyldipropylammonium, halopropylmethylbutylpropylammonium, halobutylmethylbutylpropylammonium, halopentylmethylbutylpropylammonium, halohexylmethylbutylpropylammonium, halopropylmethyldibutylammonium, halobutylmethyldibutylammonium, halopentylmethyldibutylammonium, halohexylmethyldibutylammonium, halopropyltriethylammonium, halobutyltriethylammonium, halopentyltriethylammonium, halohexyltriethylammonium, halopropyldiethylpropylammonium, halobutyldiethylpropylammonium, halopentyldiethylpropylammonium, halohexyldiethylpropylammonium, halopropyldiethylbutylammonium, halobutyldiethylbutylammonium, halopentyldiethylbutylammonium, halohexyldiethylbutylammonium, halopropylethyldipropylammonium, halobutylethyldipropylammonium, halopentylethyldipropylammonium, halohexylethyldipropylammonium, halopropylbutylethylpropylammonium, halobutylbutylethylpropylammonium, halopentylbutylethylpropylammonium, halohexylbutylethylpropylammonium, halopropyldibutylethylammonium, halobutyldibutylethylammonium, halopentyldibutylethylammonium, halohexyldibutylethylammonium, halopropyltripropylammonium, halobutyltripropylammonium, halopentyltripropylammonium, halohexyltripropylammonium, halopropylbutyldipropylammonium, halobutylbutyldipropylammonium, halopentylbutyldipropylammonium, halohexylbutyldipropylammonium, halopropyldibutylpropylammonium, halobutyldibutylpropylammonium, halopentyldibutylpropylammonium, halohexyldibutylpropylammonium, halopropyltributylammonium, halobutyltributylammonium, halopentyltributylammonium, and halohexyltributylammonium.

The haloalkyltrialkylammonium can be obtained by a reaction between a dihaloalkane represented by the formula (13) and a trialkylamine represented by the formula (14). $R_1$ to $R_3$, n, $X_2$, and $X_3$ are as previously described and will therefore not be described again.

The reaction which gives a haloalkyltrialkylammonium can be carried out, for example, by mixing a dihaloalkane represented by the formula (13) and a trialkylamine represented by the formula (14) in a solvent such as diethyl ether or tetrahydrofuran. This reaction is preferably carried out at 0 to 50° C.

The dihaloalkane represented by the formula (13) and the trialkylamine represented by the formula (14), which are used in the step (iii-b), can respectively be a dihaloalkane and a trialkylamine that react with each other to give a haloalkyltrialkylammonium as described above. The step (iii-b) can be accomplished by a sequential reaction consisting of reacting the structural unit represented by the formula (11) with the dihaloalkane represented by the formula (13) and subsequently reacting the resulting reaction product with the trialkylamine represented by the formula (14). If desired, the product of the reaction between the structural unit represented by the formula (11) and the dihaloalkane represented by the formula (13) may be isolated before the subsequent reaction. These reactions in the step (iii-b) can be carried out, for example, at 10 to 80° C.

With the use of the method for producing an ionomer resin according to the present embodiment, the ionomer resin according to the present embodiment can be produced easily and efficiently. Additionally, the method for producing an ionomer resin according to the present embodiment can avoid the use of a reagent harmful to the human body, such as chloromethyl methyl ether or methyl iodide, and allows production of an ionomer resin by easy operation. The method for producing an ionomer resin according to the present embodiment is also advantageous in that the materials to be used are easily available.

The method for producing an ionomer resin according to the present embodiment preferably further includes: a step (i) of copolymerizing a set of monomers including a first monomer represented by formula (8) to obtain a copolymer A; and a step (ii) of hydrolyzing the copolymer A to obtain the copolymer B mentioned above. The step (i) and step (ii) are preferably performed before the step (iii). Preferably, in the formula (8), $L_{21}$ to $L_{25}$ are each independently a hydrogen atom, an alkyl group having 1 to 4 carbon atoms, an alkanol group having 1 to 4 carbon atoms, or a structure represented by formula (9-1) or (9-2) shown below, and at least one of $L_{21}$ to $L_{25}$ is a structure represented by the formula (9-1) or (9-2) shown below. More preferably, $L_{21}$ to $L_{25}$ are each independently a hydrogen atom or a structure represented by the formula (9-1) shown below, and $Z_2$ in the structure represented by the formula (9-1) is an oxygen atom. The structure represented by the formula (9-1) or (9-2) may be present at any of the ortho-, meta-, and para-positions of the benzene ring and is more preferably present at the para-position. The alkyl group having 1 to 4 carbon atoms, the alkanol group having 1 to 4 carbon atoms, $L_6$, $Z_2$, and $Z_{12}$ are as previously described and will therefore not be described again. $R_9$, $R_{19}$, and $R_{29}$ are each independently a hydrogen atom, a methyl group, or an ethyl group.

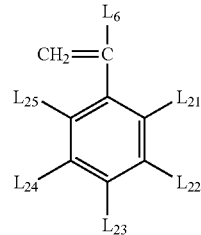

(8)

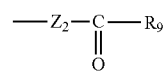

(9-1)

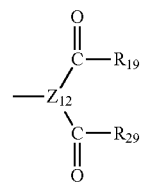

(9-2)

The step (i) will now be described. An example of the first monomer is a structure represented by formula (15). In the first monomer represented by the formula (15), the functional group [—O—C(=O)—$R_9$] bonded to the benzene ring may be present at any of the ortho-, meta-, and para-positions of the benzene ring and is more preferably present at the para-position. Specific examples of the structure used as the first monomer include vinylphenyl formate, vinylphenyl acetate, and vinylphenyl propionate.

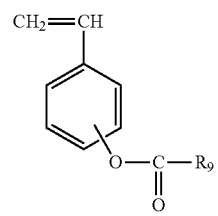

(15)

The set of monomers may include the first monomer and a second monomer. The second monomer used can be, for example, styrene or a styrene-derivative monomer. An example of the styrene-derivative monomer is one resulting from substitution of at least one hydrogen atom of styrene by a halogen atom, an alkyl or alkoxy group having 1 to 14 carbon atoms, or a halogenated alkyl group having 1 to 4 carbon atoms. Specific examples of the styrene-derivative monomer include α-methylstyrene, methylstyrene, dimethylstyrene, trimethylstyrene, ethylstyrene, propylstyrene, butylstyrene, pentylstyrene, hexylstyrene, heptylstyrene, octylstyrene, nonylstyrene, decylstyrene, undecylstyrene, dodecylstyrene, tridecylstyrene, tetradecylstyrene, methoxystyrene, ethoxystyrene, propoxystyrene, butoxystyrene, pentyloxystyrene, hexyloxystyrene, heptyloxystyrene, octyloxystyrene, nonyloxystyrene, decyloxystyrene, undecyloxystyrene, dodecyloxystyrene, tridecyloxystyrene, tetradecylstyrene, cyclohexylstyrene, chloromethylstyrene, trifluoromethylstyrene, ethoxymethylstyrene, dimethoxystyrene, tert-butoxystyrene, 1-ethoxyethoxystyrene, chlorostyrene, dichlorostyrene, bromostyrene, iodostyrene, fluorostyrene, 4-bromobutylstyrene, acetoxymethylstyrene, and acetoxystyrene. Examples of the second monomer other than these styrene-derivative monomers include: aromatic ring-containing monomers having two or more vinyl groups, such as divinylbenzene, trivinylbenzene, divinyltoluene, and divinylnaphthalene; unsaturated hydrocarbon monomers such as isoprene, butadiene, and isobutene; vinyl ether monomers such as methyl vinyl ether, ethyl vinyl ether, propyl vinyl ether, butyl vinyl ether, isobutyl vinyl ether, tert-butyl vinyl ether, cyclohexyl vinyl ether, 2-ethylhexyl vinyl ether, isooctyl vinyl ether, dodecyl vinyl ether, hexadecyl vinyl ether, octadecyl vinyl ether, phenyl vinyl ether, 2-chloroethyl vinyl ether, 2-hydroxyethyl vinyl ether, 4-hydroxybutyl vinyl ether, diethylene glycol monovinyl ether, diethylene glycol divinyl ether, triethylene glycol monovinyl ether, triethylene glycol divinyl ether, divinyl ether, 2,2,2-trifluorovinyl ether, perfluoropropoxyethylene, 2-bromotetrafluoroethyl trifluorovinyl ether, and 2-(heptafluoropropoxy)hexafluoropropyl trifluorovinyl ether; (meth)acrylate monomers such as (meth)acrylic acid, methyl (meth)acrylate, ethyl (meth)acrylate, n-propyl (meth)acrylate, n-butyl (meth)acrylate, 2-ethylhexyl (meth)acrylate, glycidyl (meth)acrylate, glycerol (meth)acrylate, hydroxypropyl (meth)acrylate, 2-hydroxyethyl (meth)acrylate, 3-chloro-2-hydroxypropyl (meth)acrylate, tetrahydro-2-furanylmethyl (meth)acrylate, 2-furylmethyl (meth)acrylate, alkoxyalkyl (meth)acrylate, oligoalkoxyalkyl (meth)acrylate, and alkoxyoligoalkoxyalkyl (meth)acrylate; (meth)acrylamide monomers such as (meth)acrylamide, N-alkyl (meth)acrylamide, N,N-dialkyl(meth)acrylamide, N-(meth)acryloyl-2-methylaziridine, N-(meth)acryloylaziridine, N-(meth)acryloylazetidine, N-(meth)acryloylpyrrolidine, N-(meth)acryloylpiperidine, N-(meth)acryloylmorpholine, N-[tris(hydroxymethyl)methyl](meth)acrylamide, N-hydroxyethyl(meth)acrylamide, N-[2-(2-hydroxyethoxy)ethyl](meth)acrylamide, 2-dimethylaminoethyl (meth)acrylate, 2-diethylaminoethyl (meth)acrylate, 2-(butylamino)ethyl (meth)acrylate, 2-isocyanatoethyl (meth)acrylate, 2-(diisopropylamino)ethyl (meth)acrylate, 2-N-morpholinoethyl (meth)acrylate, N,N-dimethylaminoethyl(meth)acrylamide, and N,N-dimethylaminopropyl(meth)acrylamide; allyl monomers such as allylamine, allylamine hydrochloride, and diallyldimethylammonium chloride; vinyl ester monomers such as vinylformamide, vinylacetamide, and vinyl propionate; and difunctional (meth)acrylate monomers such as ethylene glycol di(meth)acrylate.

Among the above monomers, styrene, a styrene-derivative monomer, an aromatic ring-containing monomer having two or more vinyl groups, an unsaturated hydrocarbon monomer, a vinyl ether monomer, or an allyl monomer is preferably used as the second monomer in terms of alkali resistance. Examples of the styrene-derivative monomer which is preferably used in terms of alkali resistance include butylstyrene, pentylstyrene, hexylstyrene, heptylstyrene, octylstyrene, nonylstyrene, decylstyrene, undecylstyrene, dodecylstyrene, butoxystyrene, pentyloxystyrene, hexyloxystyrene, heptyloxystyrene, octyloxystyrene, nonyloxystyrene, decyloxystyrene, undecyloxystyrene, dodecyloxystyrene, chloromethylstyrene, trifluoromethylstyrene, chlorostyrene, bromostyrene, iodostyrene, fluorostyrene, and 4-bromobutylstyrene. Examples of the aromatic ring-containing monomer having two or more vinyl groups which is preferably used in terms of alkali resistance include divinylbenzene. Examples of the unsaturated hydrocarbon monomer which is preferably used in terms of alkali resistance include isoprene, butadiene, and isobutene. Examples of the allyl monomer which is preferably used in terms of alkali resistance include diallyldimethylammonium chloride. In terms of alkali resistance and production, it is more preferable to use styrene or a styrene-derivative monomer as the second monomer. One of the above second monomers may be used alone, or two or more thereof may be used in combination.

The polymerization in the step (i) can be carried out by a known polymerization process. Examples of the polymerization process that can be used include radical polymerization, cationic polymerization, and thermal polymerization.

The radical polymerization can be performed, for example, by adding a monomer to an organic solvent and further adding a radical polymerization initiator in an atmosphere of inert gas such as nitrogen gas. The radical polymerization is typically performed at a temperature of 30 to 200° C.

Examples of the radical polymerization initiator that can be used in the radical polymerization include: azo compounds such as 2,2'-azobisisobutyronitrile (AIBN), 2,2'-azobis-(2,4-dimethylvaleronitrile), 2,2'-azobis-(4-methoxy-2,4-dimethylvaleronitrile), 2,2'-azobismethylbutyronitrile, 2,2'-azobiscyclohexanecarbonitrile, cyanomethylethylazoformamide, 2,2'-azobis(methyl 2,4-dimethylpropionate), and 2,2'-azobiscyanovaleric acid; organic peroxides such as benzoyl peroxide, lauroyl peroxide, 1,1'-bis-(tert-butylperoxy)cyclohexane, 3,5,5-trimethylhexanoyl peroxide, and tert-butyl peroxy-2-ethylhexanoate; and hydrogen peroxide.

The solvent used in the radical polymerization can be selected as appropriate depending on the composition of the monomer. Examples of the solvent include: aromatics such as toluene, benzene, xylene, ethylbenzene, benzonitrile, benzyl alcohol, and anisole; esters such as ethyl acetate and butyl acetate; ketones such as acetone and methyl ethyl ketone; ethers such as tetrahydrofuran and diethyl ether; and alcohols such as methanol, ethanol, propanol, butanol, propylene glycol, 1,2-ethanediol (ethylene glycol), and 2,2-oxydiethanol (diethylene glycol); and water. Aprotic polar solvents such as N,N-dimethylformamide and dimethyl sulfoxide may be used. One of these solvents may be used alone, or two or more of the solvents may be used in combination. If desired, the polymerization may be performed without the use of any solvent.

In the radical polymerization, 2,2,6,6-tetramethyl-1-piperidinyloxy, 2,2,5-trimethyl-4-phenyl-3-azahexane-3-oxy, N-tert-butyl-(1-diethylposphono-2,2-dimethylpropyl)-N-oxy, N-tert-butyl-N-(1-tert-butyl-2-ethylsulfinyl)propyl-N-oxy, iodine, mercaptan, or styrene dimer can be added as a polymerization aid, if desired.

The step (ii) will next be described. The hydrolysis of the copolymer A can be accomplished by a known method. For example, the hydrolysis can be performed by dissolving or immersing the copolymer A in a solvent containing an alkaline agent. If desired, the hydrolysis may be followed by addition of an acid to neutralize the system. As the alkaline agent there can be used, for example, potassium hydroxide or sodium hydroxide. As the acid there can be used, for example, hydrochloric acid or acetic acid. Examples of the solvent include water, methanol, and acetone. One of these solvents may be used alone, or two or more of the solvents may be used in combination.

The copolymer B produced by the hydrolysis of the copolymer A has a structural unit represented by the formula (4) which results from the hydrolysis of the first structural unit. The structural unit represented by the formula (4) is as previously described and will therefore not be described again. The copolymer B has, for example, a structural unit represented by the formula (11). The subsequent step (iii) may be performed after isolation and purification of the copolymer B produced by the hydrolysis of the copolymer A or may be performed without isolation of the copolymer B.

[Ionomer Solution]

Next, the ionomer solution will be described. The ionomer solution according to the present embodiment includes the ionomer resin according to the present embodiment and a solvent and preferably includes an organic solvent and the ionomer resin according to the present embodiment which is dissolved in the organic solvent. The ionomer resin is as previously described and will therefore not be described again.

Examples of the organic solvent included in the ionomer solution include methanol, ethanol, 1-propanol, 2-propanol, 1-butanol, 2-butanol, 2-methyl-1-propanol, 2-methyl-2-propanol, acetonitrile, N,N-dimethylformamide, N,N-dimethylacetamide, dimethyl sulfoxide, N-methylpyrrolidone, acetone, methyl ethyl ketone, methyl acetate, ethyl acetate, propyl acetate, isopropyl acetate, butyl acetate, isobutyl acetate, tert-butyl acetate, sec-butyl acetate, tetrahydrofuran, 1,4-dioxane, chloroform, methylene chloride, carbon tetrachloride, benzene, toluene, xylene, diethyl ether, and hexane. One of these organic solvents may be used alone, or a mixture of two or more of the organic solvents may be used.

The organic solvent included in the ionomer solution is removed, for example, by air drying or heating during formation of an electrode. It is thus preferable to use a highly volatile organic solvent as the organic solvent included in the ionomer solution. As such an organic solvent there is preferably used at least one selected from the group consisting of methanol, ethanol, 1-propanol, 2-propanol, 1-butanol, 2-butanol, 2-methyl-1-propanol, acetone, methyl ethyl ketone, methyl acetate, ethyl acetate, propyl acetate, isopropyl acetate, butyl acetate, isobutyl acetate, tert-butyl acetate, sec-butyl acetate, tetrahydrofuran, 1,4-dioxane, chloroform, methylene chloride, carbon tetrachloride, benzene, toluene, xylene, diethyl ether, and hexane. It is more preferable to use at least one selected from the group consisting of methanol, ethanol, 1-propanol, 2-propanol, 1-butanol, 2-butanol, 2-methyl-1-propanol, acetone, methyl ethyl ketone, ethyl acetate, tetrahydrofuran, and toluene.

[Catalyst Electrode Composition, and Electrochemical Element (A) and Electrochemical Device (I) that are Formed Using the Composition]

(Catalyst Electrode Composition)

A catalyst electrode composition according to the present embodiment includes the ionomer solution according to the present embodiment and an electrode catalyst. The electrode catalyst is preferably dispersed in the ionomer solution according to the present embodiment. Any hitherto-known catalyst can be used as the electrode catalyst without particular limitation. Anion-exchange PEFCs, unlike cation-exchange PEFCs, need not employ a noble metal such as platinum as an electrode catalyst, and the electrode catalyst can be a base metal such as nickel, cobalt, iron, or silver. A catalyst and other substances contained in the anode of a MEA and those contained in the cathode of the MEA may be the same as or different from each other. The catalyst electrode composition can be prepared by a known method. The ionomer solution is as previously described and will therefore not be described again.

(Electrochemical Element (A))

An electrochemical element (A) according to the present embodiment includes an anion-exchange polymer electrolyte membrane and an electrode. The electrode includes a catalyst layer and a gas diffusion layer arranged in this order from the anion-exchange polymer electrolyte membrane. In the electrochemical element (A) according to the present embodiment, a principal surface of the anion-exchange polymer electrolyte membrane is in contact with a principal surface of the electrode, and an anode and cathode, which are the electrode of the element, are disposed to sandwich the anion-exchange polymer electrolyte membrane. The electrode, in particular the catalyst layer of the electrode, contains a catalyst and the ionomer resin according to the present embodiment. The ionomer resin according to the present embodiment that can be used is as described above.

In the present embodiment, a known polymer electrolyte membrane for use in PEFCs can be used as the anion-exchange polymer electrolyte membrane. An example of the electrochemical element (A) according to the present embodiment is a MEA. This MEA includes an anode, a cathode, and a multilayer body including an anion-exchange polymer electrolyte membrane, and a principal surface of the anion-exchange polymer electrolyte membrane is in contact with a principal surface of one electrode selected from the anode and cathode. The anode and the cathode are disposed to sandwich the anion-exchange polymer electrolyte membrane. In the MEA, at least one of the anode and cathode contains a catalyst and the ionomer resin according to the present embodiment. The catalyst layer of at least one of the anode and cathode in the MEA can be formed using the catalyst electrode composition according to the present embodiment.

(Electrochemical Device (I))

An example of the electrochemical device (I) according to the present embodiment is an anion-exchange PEFC. The electrochemical device (I) according to the present embodiment includes the electrochemical element (A) according to the present embodiment.

In the electrochemical device (I) according to the present embodiment, the ionomer resin according to the present embodiment, which has high alkali resistance, is used to form an electrode. The electrochemical device is therefore resistant to performance degradation.

The electrochemical device (I) according to the present embodiment can further include a known component. A PEFC, which is an example of the electrochemical device (I), may include, as appropriate, a fuel feeder, an oxidant feeder, a humidifier, a current collecting plate, and components for detecting the state of electricity generation such as a temperature sensor, an oxygen sensor, a flow meter, and a humidity sensor.

[Multilayer Body, and Electrochemical Element (B), Member, and Electrochemical Device (II) that Include the Multilayer Body]

(Multilayer Body)

A multilayer body according to the present embodiment includes two or more layers, and the two or more layers include a first layer according to the present embodiment. The first layer contains the ionomer resin according to the present embodiment and, even when used in an alkaline environment, is less likely to suffer a decrease in the amount of the anion-exchange group and exhibits high alkali resistance. The ionomer resin is as previously described and will therefore not be described again. The multilayer body according to the present embodiment can be used, for example, as an anion-exchange membrane.

In anion-exchange PEFCs, water is produced by a reaction at the anode, and a liquid fuel may be supplied to the anode together with water. Additionally, in anion-exchange PEFCs, water is necessary for a reaction at the cathode, and water may therefore be supplied to the cathode together with air. Thus, to maintain the performance of a PEFC, it is preferable to prevent dissolution of the first layer, and it is therefore preferable that the first layer be insoluble in water. Whether the first layer is insoluble in water may be determined, for example, by immersing a sample in the form of a film in water and visually observing the change in shape of the sample. Given the exposure to a heated environment under actual electricity generation conditions, the amount of the first layer dissolved is preferably less than 0.1 g, more preferably less than 0.05 g, and even more preferably less than 0.01 g when 1 g of the first layer is added to 100 g of water at 80° C.

The thickness of the first layer can be varied depending on, for example, the electricity generation conditions and the configuration of the MEA. The thickness of the first layer is preferably in the range of 0.1 μm to 20 μm and more preferably in the range of 0.5 μm to 15 μm. In particular, when a multilayer body including the first layer having such a thickness is used in a MEA, it is possible to reduce the increase in resistivity of the first layer, achieve high chemical durability, and prevent defects such as pinholes.

The ion-exchange capacity of the first layer is preferably in the range of 0.1 to 2 mmeq/g and more preferably in the range of 0.3 to 1.8 mmeq/g. When the first layer having such an ion-exchange capacity is used, water can be retained in the first layer, and this water can be exploited for a reaction at the cathode. The use of such a first layer can contribute to improvement in the ionic conductivity of a MEA and thereby contribute to improvement in the electricity generation efficiency of a PEFC. If the ion-exchange capacity is excessively high, the first layer may have a low mechanical strength and tend to be broken. If the ion-exchange capacity is excessively high, the first layer may retain an excess amount of water so that there may occur flooding phenomenon in which the excess amount of retained water inhibits the electrochemical reaction in the PEFC.

The first layer can contain other substances as long as the effect of the invention is not impaired. Examples of the other substances include a radical quencher (a chemical substance capable of binding to radicals) and a water-retaining agent.

The first layer may have anionic species (counter ion). The anionic species is, for example, a hydroxide, carbonate, bicarbonate, or halide ion. Examples of the halide ion include fluoride, chloride, bromide, and iodide ions.

The copolymer contained in the first layer preferably has the second structural unit in addition to the first structural unit. The second structural unit is as previously described and will therefore not be described again.

The number of moles of the first structural unit in the copolymer contained in the first layer is also as previously described. To have a high ionic conductivity, the first layer needs to have a high ion-exchange capacity. To this end, it is preferable that the first layer have a high content of the first structural unit having an ion-exchange group. However, if the content of the first structural unit in the copolymer having the first structural unit is excessively high, the solubility of the copolymer in water may be increased, and thus the copolymer may be unusable in the first layer. If the content of the second structural unit is excessively high, the alkali resistance of the first layer may decrease. When the first layer contains a copolymer in which the ratio of the number of moles of the first structural unit is in an appropriate range, the first layer has high ionic conductivity and high alkali resistance. Such a first layer can be suitably used in a PEFC.

An exemplary method that can be suitably used for producing a material for forming the first layer is the above-described method for producing a copolymer included in an ionomer resin.

Anion-exchange membranes for use in MEAs of anion-exchange PEFCs are required to have alkali resistance. The use of the multilayer body according to the present embodiment which includes a catalyst layer and the first layer allows the first layer, which has high alkali resistance, to be easily incorporated in a MEA. The multilayer body according to the present embodiment includes the first layer having high alkali resistance and is less likely to suffer deterioration, alteration, or decomposition of the anion-exchange group contained as a functional group. The use of the multilayer body according to the present embodiment leads to an increase in resistance to alkaline environments. The use of the multilayer body according to the present embodiment can contribute to the maintenance of the performance of a MEA and therefore the maintenance of the electricity generation efficiency of a PEFC.

The multilayer body can be produced by a known method. Examples of the method include: a method in which two or more layers are individually formed first and then these layers are stacked together; and a method in which a first layer-forming solution is applied and dried on another layer to form a multilayer body having the first layer stacked on the other layer. For example, the ionomer solution according to the present embodiment can be used as the first layer-forming solution. The first layer-forming solution used may be prepared by dissolving a previously formed first layer in a solution. The application of the solution can be accomplished by spray coating, screen printing, gravure printing, die coating, or comma coating. The application technique can be selected as appropriate depending on, for example, the viscosity of the solution, the vapor pressure and boiling point of the solvent, and the desired thickness of the first layer.

When the method in which the first layer-forming solution is applied is used, the solvent contained in the solution is not particularly limited as long as the first layer is soluble or dispersible in the solvent. Examples of such a solvent include: alcohols such as methanol, ethanol, 1-propanol, 2-propanol, 1-butanol, 2-butanol, isobutanol, tert-butanol, 1-pentanol, 2-pentanol, 3-pentanol, isopentanol, tert-amyl alcohol, and neopentyl alcohol; glycol monoethers such as 2-methoxyethanol (ethylene glycol monomethyl ether or methyl glycol), 2-(2-methoxyethoxy)ethanol (methyl diglycol), 1-methoxy-2-propanol (propylene glycol monomethyl ether), and 1-propoxy-2-propanol (propylene glycol monopropyl ether); glycols such as 1,2-ethanediol (ethylene glycol), 1,2-propanediol (propylene glycol), and 2,2-oxydiethanol (diethylene glycol); and other solvents such as acetonitrile, N,N-dimethylformamide, N,N-dimethylacetamide, N-methylpyrrolidone, dimethyl sulfoxide, acetone, methyl ethyl ketone, methyl acetate, ethyl acetate, propyl acetate, isopropyl acetate, butyl acetate, isobutyl acetate, tert-butyl acetate, sec-butyl acetate, diethyl ether, tetrahydrofuran, 1,4-dioxane, chloroform, methylene chloride, carbon tetrachloride, benzene, toluene, xylene, and hexane. One of these solvents may be used alone, or a mixture of two or more of the solvents may be used. To facilitate the formation of the first layer, it is preferable to use a solvent mentioned above as a highly volatile organic solvent.

To reduce the environmental impact and reduce the risk of fire or explosion, the above solvent is preferably a mixed solvent containing water and a water-soluble organic solvent and more preferably a mixed solvent containing water and an organic solvent capable of being mixed with water in any proportion. The water-soluble solvent is preferably a solvent having a solubility in water at 20° C. of 20 g/L or more, more preferably a solvent having a solubility in water at 20° C. of 50 g/L or more, and even more preferably a solvent (water-miscible organic solvent) capable of being mixed with water in any proportion. Examples of such solvents include: alcohols such as methanol, ethanol, 1-propanol, 2-propanol, 1-butanol, 2-butanol, isobutanol, and tert-butanol; glycol monoethers such as ethylene glycol monomethyl ether, propylene glycol monomethyl ether, and propylene glycol monopropyl ether; glycols such as ethylene glycol, propylene glycol, and diethylene glycol; and other solvents such as acetone, tetrahydrofuran, dioxane, N,N-dimethylformamide, N,N-dimethylacetamide, and dimethyl sulfoxide. Examples of the water-miscible organic solvent include methanol, ethanol, 1-propanol, 2-propanol, tert-butanol, ethylene glycol, propylene glycol, ethylene glycol monomethyl ether, propylene glycol monomethyl ether, propylene glycol monopropyl ether, diethylene glycol, acetone, tetrahydrofuran, dioxane, N,N-dimethylformamide, and dimethyl sulfoxide. One of these organic solvents may be mixed with water, or two or more thereof may be mixed with water. These organic solvents are also suitable for use as the solvent of the ionomer solution according to the present embodiment.

When a mixed solvent containing a water-soluble organic solvent and water is used, the mixing ratio between water and the water-soluble organic solvent, as expressed by the content of water in the mixed solvent, is such that the content of water relative to the total weight of the solvent is, for example, 10 wt % or more and 90 wt % or less, 20 wt % or more and 80 wt % or less, or 30 wt % or more and 70 wt % or less. It is not preferable that the content of water be excessively low, in terms of reduction in the environmental impact, reduction in the stress on the human health, and reduction in the risk of fire or explosion. If the content of water is excessively high, the first layer may be dissolved and thus may fail to retain its shape. The preferred range of the mixing ratio varies depending on the type of the organic solvent. When an alcohol having 1 to 3 carbon atoms is used as the organic solvent, the content of water in the mixed solvent is preferably 35 wt % or more and 60 wt % or less and more preferably 35 wt % or more and 55 wt % or less.

To successfully remove the solvent contained in the first layer-forming solution, the solvent used is preferably a solvent having a boiling point of 150° C. or lower and more preferably a solvent having a boiling point of 120° C. or lower. This also applies to the ionomer solution according to the present embodiment.

The thickness of the multilayer body according to the present embodiment is preferably in the range of 5 µm to 150 µm and more preferably in the range of 10 µm to 100 µm. The use of the multilayer body having such a thickness can reduce the occurrence of defects such as pinholes and can lower the membrane resistance.

Hereinafter, a multilayer body (A) and a multilayer body (B) will be described as embodiments of the multilayer body.

(Multilayer Body (A))

In the multilayer body (A) according to the present embodiment, the two or more layers can include the second layer described below. The first layer is more preferably stacked on the second layer. The multilayer body (A) according to the present embodiment may include a plurality of the first layers and may include a plurality of the second layers. Specifically, the multilayer body (A) according to the present embodiment may be a membrane composed of the first layer (1), the second layer, and the first layer (2) that are stacked in this order or may be a membrane composed of the second layer (1), the first layer, and the second layer (2) that are stacked in this order.

The multilayer body (A) can be produced, for example, by a method in which the first layer and the second layer are individually formed and then these layers are stacked together or by a method in which a first layer-forming solution is applied and dried on a principal surface of the second layer to form a multilayer body having the first layer stacked on the second layer.

To have high anionic conductivity, the second layer preferably has an anion-exchange polymer electrolyte membrane (anion-exchange membrane). The anion-exchange polymer electrolyte membrane has a functional group having anionic conductivity. The functional group having anionic conductivity is an anion-exchange group and is preferably at least one selected from the group consisting of an amino group (primary, secondary, or tertiary amino group), a quaternary ammonium salt group, a pyridyl group, an imidazole group, a quaternary pyridinium salt group, a sulfonium salt group, and a phosphonium salt group.

A known anion-exchange membrane can be used as the anion-exchange polymer electrolyte membrane included in the second layer; for example, a pore-filled membrane or a grafted membrane can be used. A pore-filled membrane is a membrane including a porous polymer membrane whose pores are filled with a polymer electrolyte, and the filling polymer electrolyte has an anion-exchange group. When the second layer includes a grafted membrane, this grafted membrane preferably includes a polymer substrate and an anion-conductive graft chain, the graft chain having a functional group having anionic conductivity.

The following description uses a grafted membrane as an example, but is not intended to limit the anion-exchange polymer electrolyte membrane to a grafted membrane. The following description uses radiation graft polymerization as an example of the method for producing the grafted membrane included in the second layer, but is not intended to limit the method for producing the grafted membrane to radiation graft polymerization.

A polymer substrate that can be subjected to radiation graft polymerization is suitable as the polymer substrate for use in production of the grafted membrane, and examples of the suitable polymer substrate include a substrate composed of a hydrocarbon polymer such as polyethylene and a substrate composed of a fluorine-containing polymer. The polymer substrate is preferably composed of at least one selected from polyolefin, polystyrene, and polyetherketone.

The radiation used is, for example, ionizing radiation such as α-radiation, β-radiation, γ-radiation, electron radiation, or ultraviolet radiation, and is particularly preferably γ-radiation or electron radiation. The radiation dose is preferably in the range of 1 to 300 kGy and more preferably in the range of 10 to 100 kGy. If the radiation dose is excessively low, the amount of radicals produced in the polymer substrate by the radiation exposure may be so small that the graft polymerization is difficult to accomplish. If the radiation dose is excessively high, the radiation exposure may cause decomposition of the polymer substrate, or the radiation exposure may produce a larger amount of radicals, leading to excessive polymerization. The polymer substrate exposed to radiation may be stored at a low temperature (for example, −30° C. or lower, preferably −60° C. or lower) to avoid deactivation before graft polymerization.

The graft chain may be introduced using a grafting monomer having a functional group having anionic conductivity, or a functional group having anionic conductivity may be introduced into the graft chain resulting from graft polymerization. The grafting monomer preferably has a carbon-carbon unsaturated bond and a moiety capable of introducing a functional group having anionic conductivity. The functional group having anionic conductivity is, for example, at least one selected from primary to tertiary amino groups, a quaternary ammonium salt group, a pyridyl group, an imidazole group, a quaternary pyridinium salt group, a sulfonium salt group, and a phosphonium salt group.

An example of the graft chain is a polymer chain having a quaternary ammonium group. Quaternary ammonium groups are preferred due to their high anionic conductivity. The introduction of a quaternary ammonium group into the graft chain can be accomplished, for example, by forming a polymer chain as the graft chain from a monomer having a halogenated alkyl group and then performing quaternization in which the halogenated alkyl group is reacted with an amine (tertiary amine). In this quaternization, there takes place a nucleophilic substitution reaction which is a halogen-exchange reaction leading to alkylation of the tertiary amine. The graft chain typically has a quaternary ammonium group in its side chain.

The thickness of the second layer is preferably in the range of 5 µm to 130 µm and more preferably in the range of 12 µm to 70 µm. The use of the second layer having such a thickness can result in a multilayer body that has low membrane resistance, that has a low incidence of membrane breakage, and that is less likely to suffer defects such as pinholes. The polymer substrate tends to thicken as a result of the graft polymerization step and anion-exchange group introduction step. Thus, the thickness of the polymer substrate is preferably in the range of 5 µm to 100 µm and more preferably in the range of 10 µm to 50 µm.

(Electrochemical Element (B) Including Multilayer Body (A))

The multilayer body (A) according to the present embodiment can be used to form an electrochemical element (B). An example of the electrochemical element (B) is a membrane-electrode assembly (MEA) for use in an anion-exchange PEFC. The MEA according to the present embodiment includes an anode, a cathode, and a multilayer body including an anion-exchange polymer electrolyte. The multilayer body is sandwiched between the anode and the cathode. The multilayer body includes a first layer and a second layer. The first layer includes the ionomer resin according to the present embodiment, and the second layer includes an anion-exchange polymer electrolyte membrane. A principal surface of the first layer is in contact with a principal surface of the second layer. As the multilayer body there can be used the multilayer body (A) according to the present embodiment. Typically, the multilayer body (A) and the electrodes are assembled together by a technique such as hot press. In general, one of the electrodes (the anode and cathode) is placed on one of the principal surfaces of the anion-exchange membrane, while the other electrode is placed on the other principal surface of the anion-exchange membrane.

FIG. 1 shows an exemplary MEA including the multilayer body (A) according to the present embodiment. The MEA 1 shown in FIG. 1 includes a first layer 7, a second layer 8, an anode 3, and a cathode 4. The first layer 7 including the ionomer resin according to the present embodiment and the second layer 8 including an anion-exchange polymer electrolyte membrane form a multilayer body 2. The multilayer body 2 is sandwiched between the anode 3 and the cathode 4.

Catalysts used in these electrodes can be those which are contained in known MEAs for use in PEFCs. The catalysts are as previously described and will therefore not be described again.

In the MEA including the multilayer body (A) according to the present embodiment, a principal surface of the first layer included in the multilayer body (A) is preferably in contact with a principal surface of the cathode. When the multilayer body (A) is used in this manner, it is possible to reduce degradation of the multilayer body (A) which can be caused at the interface between the cathode and multilayer body (A) by the fact that hydroxide ions contained in a fuel passing through the multilayer body (A) from the anode side to the cathode side and hydroxide ions resulting from oxygen reduction reaction at the cathode accumulate in the cathode side of the multilayer body (A). When the multilayer body (A) is used in the manner as described above, the multilayer body (A) exhibits high water retention ability at its principal surface in contact with the cathode and is capable of retaining water necessary for the reaction at the cathode. This can lead to an increase in the output of the cell.

(Multilayer Body (B))

The multilayer body (B) according to the present embodiment has two or more layers, and the two or more layers include a catalyst layer. It is more preferable that the first layer be stacked on the catalyst layer. The ionomer resin and first layer according to the present embodiment are as previously described and will therefore not be described again.

The catalyst layer used can be a catalyst layer which is included in known MEAs for use in PEFCs. The thickness of the catalyst layer is preferably in the range of 1 µm to 300 µm, more preferably in the range of 3 µm to 200 µm, and even more preferably in the range of 5 µm to 100 µm. When the thickness of the catalyst layer is in the above range, the catalyst can be evenly distributed in the catalyst layer so that the catalyst layer has high durability. The use of this catalyst layer in a PEFC leads to high output of the PEFC. The use of the catalyst layer having a thickness as specified above leads to a reduction in material cost. If the catalyst layer is excessively thick, there may occur a deterioration in fuel-air diffusivity and an increase in resistance. The catalyst is as previously described and will therefore not be described again.

The multilayer body (B) according to the present embodiment can be produced, for example, by a method in which the first layer is separately formed and then stacked on the catalyst layer, or by a method in which a first layer-forming solution containing the first structural unit and/or second structural unit is applied to a principal surface of the catalyst layer to form the multilayer body (B) having the first layer stacked on the catalyst layer.

The catalyst layer generally contains an inorganic material and carbon, and is less swollen by absorption of water or a solvent than anion-exchange membranes. The catalyst layer has an uneven structure and/or a porous structure, and the rate of evaporation of water or a solvent absorbed in the catalyst layer tends to be high. Thus, even with the use of the method in which a first layer-forming solution is applied to a principal surface of the catalyst layer to form the first layer, the first layer can relatively easily be formed to be uniform. This method is also preferred in that it is usable even when the first layer cannot be formed as a self-supporting film.

(Member for Electrochemical Element that Includes Multilayer Body (B))

The member for an electrochemical element according to the present embodiment is, for example, a gas diffusion electrode including the multilayer body (B) and a gas diffusion layer. A first principal surface of the gas diffusion layer is in contact with a principal surface of the catalyst layer included in the multilayer body (B).

The gas diffusion layer used can be a known gas diffusion layer for use in PEFCs. For example, "SIGRACET" manufactured by SGL Carbon SE or "TORAYCA" manufactured by Toray Industries, Inc. can be used.

In another embodiment, the member for an electrochemical element includes the multilayer body (B) and a base material, and the base material, the catalyst layer, and the first layer are stacked in this order. This base material is a base material for transfer. The member for an electrochemical element according to the present embodiment can be used as a catalyst layer transfer sheet for producing a MEA for use in fuel cells. A first principal surface of the base material is in contact with a principal surface of the catalyst layer included in the multilayer body (B).

The base material for transfer can be a known base material for use in catalyst layer transfer sheets, and a sheet having high releasability can be used. Examples of the material of the base material for transfer include polytetrafluoroethylene and tetrafluoroethylene-hexafluoropropylene copolymer.

The member for an electrochemical element according to the present embodiment can be produced by a known method, as long as the effect of the invention is not impaired. Specifically, a method can be used in which a catalyst ink (catalyst electrode composition) for forming an electrode is applied and dried on a base material for transfer and then the first layer is formed on a principal surface of the resulting electrode. The catalyst ink used can be a known catalyst ink for use in PEFCs. The catalyst ink includes, for example, an ionomer solution (a solution prepared by dissolving in a solvent a resin including an ion-conductive polymer material) and an electrode. A method for forming a MEA using a catalyst layer transfer sheet is more advantageous in terms of high flexibility in process design than a method in which a catalyst ink is applied to a polymer electrolyte membrane or gas diffusion layer. Specifically, the method for forming a MEA using a catalyst layer transfer sheet, which does not involve application of a catalyst ink to a polymer electrolyte membrane or gas diffusion layer, is less limited by various factors such as swelling of the polymer electrolyte membrane caused by absorption of water or a solvent, thermal contraction, the porosity of the gas diffusion layer, and the permeability to water or a solvent.

(Electrochemical Device (II))

Figure 2:
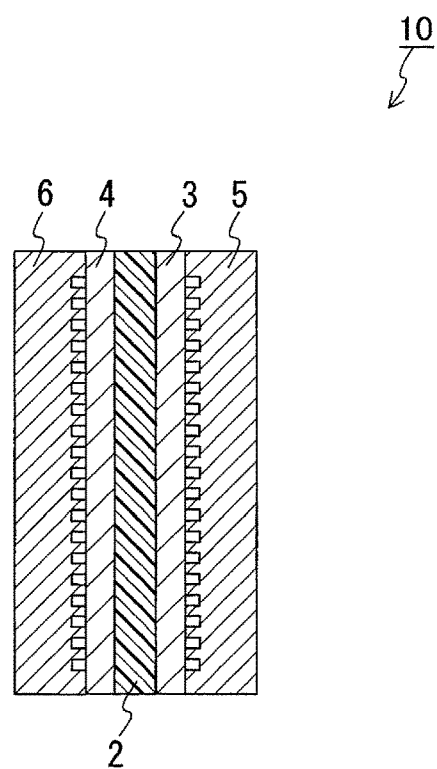
FIG. 2 is a cross-sectional view schematically showing an exemplary PEFC which is a preferred example of the electrochemical device according to the present invention.

FIG. 2 shows an exemplary electrochemical device including the electrochemical element (B) according to the present embodiment. The PEFC 10 shown in FIG. 2 includes a pair of electrodes (an anode 3 and a cathode 4) disposed to sandwich a multilayer body 2 and a pair of separators (an anode separator 5 and a cathode separator 6) disposed to sandwich the pair of electrodes, and these components are joined together by a pressure applied in a direction perpendicular to the principal surfaces of the components. The multilayer body 2 and the electrodes 3 and 4 form a MEA 1.

When a principal surface of at least one of the electrodes is in contact with a principal surface of the first layer in the electrochemical element (B) according to the present embodiment, alkali-induced deterioration, alteration, or decomposition of the functional group at the interface between the electrolyte membrane and the electrode can be prevented, which can contribute to improvement in the stability and durability of an electrochemical device.

In the electrochemical device (II) according to the present embodiment, a fuel is supplied to the anode, while an oxidant is supplied to the cathode. The fuel is, for example, an alkaline fuel containing an alcohol or hydrazine (hydrate). A fuel containing hydrazine (hydrate) is preferred since hydrazine is highly reactive and, according to the electricity generation principle, does not produce $CO_2$. The oxidant is, for example, air.

In particular, in some anion-exchange PEFCs using a liquid fuel, an alkali agent such as potassium hydroxide is supplied to the anode together with the liquid fuel. In such an anion-exchange PEFC using a liquid fuel, the alkali agent supplied to the anode of the PEFC comes into contact with the anode side of the anion-exchange membrane. The contact of high concentration of alkali with the anode side of the anion-exchange membrane can cause deterioration of the anion-exchange group at the anode side of the anion-exchange membrane. In the electrochemical device (II) according to the present embodiment, the use of the electrochemical element (B) can prevent a phenomenon such as the deterioration of the anion-exchange group at the anode side of the anion-exchange membrane.

In some anion-exchange PEFCs using a liquid fuel, a strong alkali such as potassium hydroxide is supplied together with the liquid fuel. When the liquid fuel passes through the anion-exchange membrane from the anode side to the cathode side, the alkali contained in the fuel may also be transported to the cathode side. The transported alkali may accumulate at the cathode side of the anion-exchange membrane. Additionally, the cathode in the anion-exchange PEFC is likely to become dry during electricity generation since water is consumed in the oxygen reduction reaction at the cathode. Furthermore, the cathode is likely to be exposed to a high-concentration alkaline environment since the reaction at the cathode produces anions ($OH^-$). This may accelerate the degradation of the cathode side of the anion-exchange membrane. The use of the electrochemical element (B) according to the present embodiment can prevent a phenomenon such as the deterioration of the anion-exchange group at the cathode side of the anion-exchange membrane. The first layer can have high water retention ability at its principal surface in contact with the cathode and is thus capable of retaining water necessary for the reaction at the cathode. This can lead to an increase in the output of the cell.

EXAMPLES

Hereinafter, examples of the present invention and comparative examples will be described. The present invention is not limited to the examples. The experiments and measurements described below were performed at 25° C., unless otherwise stated. The term "room temperature" as used in the following description refers to a temperature of 25° C. The abbreviations used in the examples and comparative examples described below are as follows.

4VPA: 4-Vinylphenyl acetate
VPh: Vinylphenol
CMS: 4-Chloromethylstyrene
DMSO: Dimethyl sulfoxide
DMF: N,N-Dimethylformamide
St: Styrene
C8: Octyloxystyrene (Method for Fabricating Cast Membrane)

Cast membranes were fabricated by the following method using ionomer resins obtained in Examples and Comparative Examples. First, 1 g of the ionomer resin was dissolved in 10 g of ethanol. The resulting solution was applied to a membrane of PFA (tetrafluoroethylene-perfluoroalkyl vinyl ether copolymer). This PFA membrane was air-dried to evaporate ethanol and then further dried at 60° C. for 1 hour or more.

(Method for Measuring Ion-Exchange Capacity)

Each cast membrane was cut to prepare a test specimen for ion-exchange capacity measurement, and the test specimen was immersed in a 3 mol/L (23° C.) aqueous solution of sodium chloride for 10 hours or more to change the counter anions of the ionomer resin to chloride ions. After that, the test specimen was immersed in a 1 mol/L aqueous solution of sodium nitrate ($NaNO_3$) for 12 hours or more. The liberated chloride ions were titrated with a 0.05 mol/L aqueous solution of silver nitrate ($AgNO_3$) to measure the ion-exchange capacity.

(Method for Evaluating Alkali Resistance)

Each of the cast membranes fabricated from the ionomer resins obtained in Examples and Comparative Examples was cut to prepare two test specimens in the shape of a square 5 cm on a side. The ion-exchange capacity of one of the prepared test specimens was measured. The measured ion-exchange capacity was defined as "initial ion-exchange capacity". The other test specimen was immersed in 100 mL of a 1 mol/L aqueous solution of potassium hydroxide placed in a polytetrafluoroethylene container, which was allowed to stand at 80° C. After a lapse of predetermined time, the membrane was taken out of the solution. The immersed membrane was washed several times with pure water. The ion-exchange capacity of the washed membrane was measured. This ion-exchange capacity was defined as "ion-exchange capacity after alkali resistance test".

The ratio of the ion-exchange capacity after alkali resistance test to the initial ion-exchange capacity (ion-exchange capacity after alkali resistance test/initial ion-exchange capacity) was defined as an ion-exchange capacity retention (%), which was used as an index for the alkali resistance test.

(Method for Measuring Average Particle Diameter of Electrode Catalyst)

Samples for average particle diameter measurement were prepared using the ionomer resins obtained in Examples and Comparative Examples. The preparation of the samples was performed as follows: catalyst electrode compositions were prepared using the ionomer resins obtained in Examples and Comparative Examples, and each catalyst electrode composition was diluted with the same solvent as used in the preparation of the composition so that the volume of the composition was increased by about 10 times. Specifically, ethanol was used as the solvent in Examples 1-1 and 1-3, and a mixed solvent of tetrahydrofuran and 1-propanol (tetrahydrofuran:1-propanol=7:3 in weight ratio) was used as the solvent in Comparative Example 1-4.

The average particle diameter of the electrode catalyst contained in each sample was measured by a laser diffraction particle size distribution analyzer (SALD-2100, manufactured by Shimadzu Corporation). A quartz cell of the laser diffraction particle size distribution analyzer was filled with the same solvent as used in the preparation of the catalyst electrode composition, and the sample prepared as above was added drop by drop to the quartz cell so that the absorbance would fall within the range of 0.08 to 0.10 at the start of the measurement. The average particle diameter distribution of the electrode catalyst dispersed in the catalyst electrode composition was measured, and a volume mean diameter calculated from the measured average particle diameter distribution was employed as the average particle diameter of the electrode catalyst.

(Measurement of Ratio Between Numbers of Moles of Structural Units)

The measurement sample was dissolved in deuterated chloroform, and $^1H$ NMR spectrum of the resulting solution was measured by an NMR spectrometer manufactured by Bruker Corporation at 300 MHz using tetramethoxysilane as a standard. The numbers of moles of structural units contained in the measurement sample were calculated from the measurement result.

Specifically, the ratio between an integral of a signal attributed to hydrogen atoms of acetoxy groups derived from 4VPA ($CH_3$—C=O; 2.27 ppm) and an integral of a signal attributed to hydrogen atoms of phenyl groups (6.2-7.3 ppm) was determined, and the ratio of the number of moles of acetoxy groups to the number of moles of phenyl groups ([number of moles of acetoxy groups]/[number of moles of phenyl groups]) was calculated from the ratio between the integrals. Acetoxy groups derived from 4VPA are converted to VPA (structural unit represented by formula (7)) through the subsequent hydrolysis, and the resulting structural unit is converted to the first structural unit represented by formula (11) through a further reaction. Given this, the ratio of the number of moles of acetoxy groups to the number of moles of phenyl groups was considered as the ratio of the number of moles of the first structural unit to the sum of the number of moles of the first structural unit and the number of moles of the second structural unit.

In Synthesis Example 1-6 where C8 was contained as a structural unit in addition to 4PVA and styrene, an integral of a signal attributed to hydrogen atoms of alkyl chains derived from C8 ($CH_2$ directly bonded to an oxygen atom: 3.86 ppm) was also calculated. The ratio between this integral and an integral of a signal attributed to hydrogen atoms of phenyl groups (6.2-7.3 ppm) was determined, and the ratio of the number of moles of a unit derived from C8 to the sum of the number of moles of the first structural unit and the number of moles of the second structural unit was determined on the basis of the ratio between the integrals.

(Measurement of Functional Group Retention)

The sample was set so that its principal surface to be subjected to measurement faced upward, and depth profiling was performed by TOF-SIMS (time-of-flight secondary ion mass spectrometry) using "FRIFT V" manufactured by ULVAC-PHI, Inc. to analyze the structures present in the sample. On the basis of the analysis result, a relative intensity of the peak attributed to $C_6H_{14}N+$ (amine or ammonium component) was calculated using as a reference the intensity of the peak attributed to $C_2H_3+$ (peak attributed to organic substances generally). $C_6H_{14}N+$ is a structure contained in polymer electrolyte membranes (second layers) of Examples and Comparative Examples, and a higher retention of the peak attributed to this structure means that the degradation of the electrolyte membrane is more reduced.

Two membranes were prepared as samples for functional group retention measurement in each of Examples and Comparative Examples. One of the two membranes was used as "sample not subjected to simulated durability test", for which the intensity of the peak attributed to the functional group was measured. The other membrane was subjected to a simulated durability test described below, and the intensity of the peak attributed to the functional group was then measured for this membrane (which is referred to as "sample subjected to simulated durability test"). In the measurement on the sample subjected to simulated durability test, the multilayer body composed of the first layer and second layer, or the second layer, was removed as a sample from the MEA after the durability test, and the sample was subjected to the above measurement. When the sample to be subjected to the measurement was the multilayer body, structures were analyzed at a depth of 100 nm in the second layer from the interface between the first layer and the second layer. In Examples, when the sample available consisted only of the second layer, for example, due to separation during removal, the relative intensity of the peak attributed to the functional group was determined at a depth of 100 nm in the second layer from the surface of the second layer that had been in contact with the first layer. For a single-layer membrane obtained in Comparative Example, the principal surface of the membrane that had been in contact with the cathode was subjected to the measurement to determine the relative intensity of the peak attributed to the functional group.

The functional group retention was determined by the following equation using the calculated values of the relative peak intensity and was used as an index of the alkali resistance.

Functional group retention (%)=(Relative intensity of peak attributed to functional group in sample subjected to simulated durability test)×100/ (Relative intensity of peak attributed to functional group in sample not subjected to simulated durability test)

(Simulated Durability Test)

Figure 3:
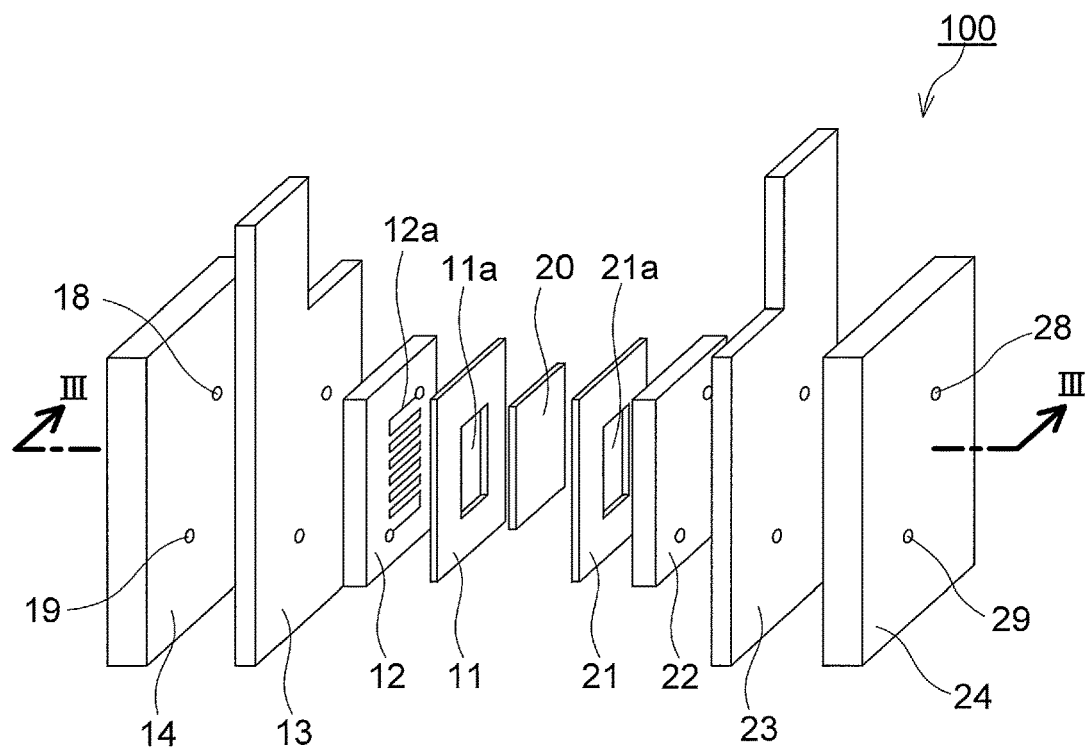
FIG. 3 is an exploded perspective view schematically showing a testing cell used for a simulated durability test.
Figure 4:
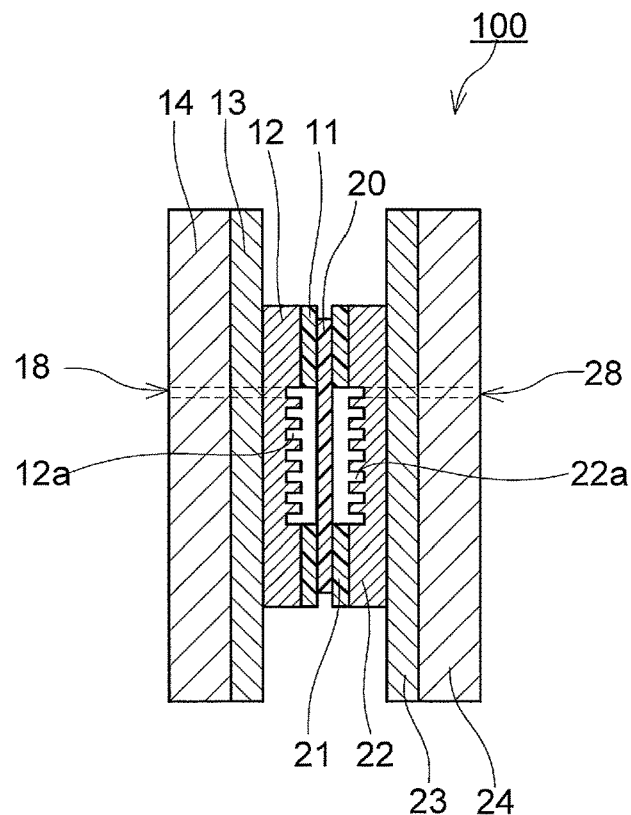
FIG. 4 is a schematic vertical cross-sectional view of the testing cell along plane III-III in FIG. 3.

A membrane 20 for simulated durability test (a multilayer body prepared in Example 2-1, a single-layer membrane prepared in Comparative Example 2-1, a test specimen prepared for simulated durability test in Example 3-1, or a test specimen prepared for simulated durability test in Comparative Example 3-1) was inserted alone in a cell for fuel cell testing which is shown in FIG. 3 and FIG. 4, and was subjected to a simulated durability test. In the testing cell, the membrane for simulated durability test was sandwiched between a pair of gaskets 11 and 12 respectively having 4-$cm^2$ rectangular openings 11a and 21a, and a pair of separators 12 and 22 respectively having flow paths 12a and 22a, a pair of current collecting plates 13 and 23, and a pair of end plates 14 and 24 were arranged in this order outwardly from the pair of gaskets. These components were fastened together by fixing means such as bolts (not shown) to prevent leakage of air or water through gaps between the contact surfaces of the components. In this manner, a cell 100 for simulated durability test was assembled. This testing cell 100 was provided with flow paths 18 and 19 for supply and discharge of water and flow paths 28 and 29 for supply and discharge of dry air. The flow paths 18, 19, 28, and 29 originate from the openings of the end plates 14 and 24, pass through the end plates 14 and 24, the current collecting plates 13 and 23, and the separators 12 and 22, and lead to the flow paths 12a and 22a.

The testing cell 100 was set so that the principal surfaces of the membrane for simulated durability test were parallel to the vertical direction. The cell 100 for simulated durability test was heated to a temperature of 60° C. A fuel (10% hydrazine hydrate+1 N potassium hydroxide (KOH)) was continuously supplied to the anode at a rate of 2 cc/min for 5 hours, during which dry air was continuously supplied to the cathode at a rate of 1000 ml/min. The membrane subjected to the simulated durability test was removed from the cell, washed with ultrapure water, and then subjected to bubbling with carbon dioxide gas in ultrapure water for 30 minutes to change the counter ion of the functional group to carbonate ion species. This membrane was used as a "sample subjected to simulated durability test" for the measurement of the functional group retention.

(Graft Ratio)

The graft ratio was calculated by the following equation.

Graft ratio (%)=100×($W_1$−$W_0$)/$W_0$ $W_0$ is the dry weight (g) of the substrate not subjected to graft polymerization, and $W_1$ is the dry weight (g) of the membrane resulting from graft polymerization. The "dry" weight refers to the weight of the substrate or membrane as determined after the substrate or membrane was placed at 60° C. for 1 hour or more and stopped showing any change in weight.

Synthesis Example 1-1

A 300-mL two-necked flask equipped with a capacitor was charged with 10.04 g (61.9 mmol) of 4VPA and 6.55 g (62.9 mmol) of styrene, to which 40 mL of toluene was added for dilution. The diluted solution was then bubbled with nitrogen gas for 45 minutes. After that, 0.208 g (1.27 mmol) of AIBN was added to the resulting solution, which was further bubbled with nitrogen gas for 25 minutes. The solution was then heated to a temperature of 70° C. Polymerization was allowed to proceed for 20 hours during which the temperature of the solution was maintained at 70° C. After the polymerization, the resulting solution was poured into a large volume of methanol to precipitate the polymer. The precipitate thus obtained was dried at 60° C. for 4 hours or more. The dried copolymer (4VPA-styrene copolymer) was a white solid and weighed 11.63 g (yield=97%).

To 2.99 g of the obtained copolymer (containing 11.8 mmol of a structure derived from 4VPA) was added 30 mL of methanol containing 1 mol/L of potassium hydroxide (KOH), and the resulting solution was diluted by adding 20 mL of methanol and then stirred. The copolymer quickly dissolved in the methanol solution containing KOH. Concentrated hydrochloric acid was added to the stirred solution to neutralize the solution. The neutralized solution was added to a large volume of water to precipitate a VPh-styrene copolymer. The precipitate thus obtained was collected and dried with a dryer at 60° C. for 24 hours. The dried copolymer (VPh-styrene copolymer) weighed 2.41 g (yield=97%).

Example 1-1

An amount of 4.08 g of VPh-styrene copolymer (containing 19.2 mmol of a structure derived from VPh) obtained in the same manner as in Synthesis Example 1-1, 7.17 g (22.6 mmol) of bromobutylbutyldimethylammonium bromide, and 3.79 g (27.4 mmol) of $K_2CO_3$ were placed in a flask, and the copolymer was dissolved by adding 50 mL of DMSO. The resulting solution was then stirred at room temperature for 150 hours. The stirred solution was filtered to remove $K_2CO_3$, and the filtered solution was added to a large volume of ethyl acetate. The resulting precipitate was dissolved in ethanol, and matter precipitated in the ethanol was then removed by filtration. After the filtration, the filtrate was added to a large volume of ethyl acetate to precipitate a copolymer The precipitated copolymer was collected by filtration and dried at 60° C. for 24 hours. The dried copolymer (ionomer resin) weighed 5.19 g (yield=64%). The amount of the ionomer resin soluble in 100 g of water at 25° C. was less than 0.01 g. The amount of the ionomer resin soluble in a 5.31% aqueous potassium hydroxide solution at 25° C. was less than 0.01 g. The amount of the ionomer resin dissolved in ethanol at 25° C. was 2 wt % or more. The obtained ionomer resin was soluble also in DMSO and DMF.

The ionomer resin obtained in Example 1-1 was dissolved in ethanol to prepare an ethanol solution containing 2 wt % of the ionomer resin. An amount of 12.13 g of this ethanol solution, 0.968 g of a carbon carrier (KETJENBLACK EC, specific surface area=800 m$^2$/g) as a model of electrode catalyst, and 20 g of ethanol were mixed using a planetary mixer to prepare a catalyst electrode composition. The average particle diameter of the electrode catalyst dispersed in the obtained catalyst electrode composition was measured. The result is shown in Table 2.

Synthesis Example 1-2

A 200-mL two-necked flask equipped with a capacitor was charged with 6.03 g (37.2 mmol) of 4VPA and 9.05 g (86.9 mmol) of styrene, to which 50 mL of toluene was added for dilution. The diluted solution was then bubbled with nitrogen gas for 50 minutes. After the bubbling, 0.201 g (1.22 mmol) of AIBN was added to the resulting solution, which was further bubbled with nitrogen gas for 20 minutes. The solution was then heated to a temperature of 70° C. Polymerization was allowed to proceed for 21 hours during which the temperature of the solution was maintained at 70° C. After the polymerization, the resulting solution was poured into a large volume of methanol to precipitate a polymer. The resulting precipitate was collected by filtration and then dried at 60° C. for 4 hours or more. The dried copolymer was a white solid and weighed 9.60 g (yield=92%).

To 8.49 g of the obtained copolymer (containing 22.0 mmol of a structure derived from 4VPA) was added 58 mL of methanol containing 1 mol/L of KOH (containing 58 mmol of KOH), followed by 58 mL of methanol. The copolymer slowly dissolved in the solution under stirring at room temperature. Concentrated hydrochloric acid was added to the solution containing the dissolved copolymer to neutralize the solution, which resulted in precipitation of a copolymer and a salt. After that, the precipitates were separated from the solution by decantation. CHCl$_3$ was added to the separated precipitates to dissolve the copolymer, and the salt remaining undissolved was removed. CHCl$_3$ was distilled off under reduced pressure, and the copolymer was then dissolved in acetone. This acetone solution was poured into a large volume of a mixture of water and methanol (water/methanol=4/1 (v/v)) to reprecipitate the copolymer. The copolymer was collected and dried with a dryer at 60° C. for 24 hours. The dried copolymer (VPh-styrene copolymer) weighed 6.50 g (yield=86%).

Example 1-2

An amount of 3.50 g of VPh-styrene copolymer (containing 12.2 mmol of a structure derived from VPh) as obtained in Synthesis Example 1-2, 5.04 g (15.9 mmol) of bromobutylbutyldimethylammonium bromide, and 2.38 g (17.2 mmol) of K$_2$CO$_3$ were placed in a flask, and the copolymer was dissolved by adding 40 mL of DMSO. The resulting solution was then stirred at room temperature for 115 hours. The stirred solution was filtered to remove K$_2$CO$_3$, and the filtrate was added to a large volume of ethyl acetate. The resulting precipitate was added to ethanol, and matter precipitated in the ethanol was removed by filtration. After the filtration, the filtrate was added to a large volume of ethyl acetate to precipitate a copolymer. The precipitated copolymer was collected by filtration and dried at 60° C. for 24 hours. The dried copolymer (ionomer resin) weighed 5.94 g (yield=93%). The amount of the ionomer resin soluble in 100 g of water at 25° C. was less than 0.01 g. The amount of the ionomer resin soluble in a 5.31% aqueous potassium hydroxide solution at 25° C. was less than 0.01 g. The amount of the ionomer resin soluble in 100 g of ethanol at 25° C. was 2 g or more. The obtained ionomer resin was soluble also in DMSO and DMF.

Synthesis Example 1-3

A 200-mL two-necked flask equipped with a capacitor was charged with 5.01 g (30.9 mmol) of 4VPA and 12.93 g (124 mmol) of styrene, to which 20 mL of toluene was added for dilution. The diluted solution was then bubbled with nitrogen gas for 1 hour. After the bubbling, 0.124 g (0.755 mmol) of AIBN was added to the resulting solution, which was further bubbled with nitrogen gas for 15 minutes. The solution was then heated to a temperature of 70° C. Polymerization was allowed to proceed for 24 hours during which the temperature of the solution was maintained at 70° C. After the polymerization, the resulting solution was poured into a large volume of methanol to give a precipitate, which was purified. The resulting precipitate was collected by filtration and then dried at 60° C. for 4 hours or more. The dried copolymer (white solid) weighed 12.66 g (yield=94%).

To 9.84 g of the obtained copolymer (containing 15.8 mmol of a structure derived from 4VPA) was added 55 mL of methanol containing 1 mol/L of KOH (containing 55 mmol of KOH), followed by 50 mL of methanol and 30 mL of acetone. The copolymer slowly dissolved under stirring at room temperature. Concentrated hydrochloric acid was added to the solution containing the dissolved copolymer to neutralize the solution, which resulted in precipitation of a copolymer and a salt. The precipitates were collected by filtration, and the collected precipitates were dissolved in acetone. This solution was poured into a large volume of a mixture of water and methanol (water/methanol=1/1 (v/v)) to cause reprecipitation. The precipitated copolymer was collected and then dried with a dryer at 60° C. for 24 hours. The dried copolymer was a white solid and weighed 7.18 g (yield=78%).

Example 1-3

An amount of 4.03 g of copolymer (containing 7.15 mmol of a structure derived from VPh) as obtained in Synthesis Example 1-3, 3.52 g (11.1 mmol) of bromobutylbutyldimethylammonium bromide, and 1.66 g (12.0 mmol) of K$_2$CO$_3$ were placed in a flask, and 25 mL of DMSO and 25 mL of DMF were added to dissolve the copolymer. The resulting solution was then stirred at room temperature for 24 hours. The stirred solution was filtered to remove K$_2$CO$_3$, and the filtered solution was added to a large volume of ethyl acetate. The resulting precipitate was dissolved in ethanol.

The resulting solution was poured into a large volume of water to precipitate a copolymer. The precipitated copolymer was collected by filtration and dried at 60° C. for 24 hours. The dried copolymer (ionomer resin) weighed 4.27 g (yield=75%). The amount of the ionomer resin soluble in 100 g of water at 25° C. was less than 0.01 g. The ionomer resin soluble in 100 g of a 5.31% aqueous potassium hydroxide solution at 25° C. was less than 0.01 g. The amount of the ionomer resin soluble in ethanol at 25° C. was 2 g or more. The obtained ionomer resin was soluble also in DMSO and DMF.

The ionomer resin obtained in Example 1-3 was dissolved in ethanol to prepare an ethanol solution containing 2 wt % of the ionomer resin. An amount of 12.14 g of this ethanol solution, 0.966 g of an electrode catalyst, and 20 g of ethanol were mixed in the same manner as in Example 1-1 to prepare a catalyst electrode composition. The average particle diameter of the electrode catalyst dispersed in the obtained catalyst electrode composition was measured. The result is shown in Table 2. The electrode catalyst used was identical to that used in Example 1-1.

Synthesis Example 1-4

A 200-mL two-necked flask equipped with a capacitor was charged with 2.50 g (15.4 mmol) of 4VPA and 14.50 g (139 mmol) of styrene, to which 20 mL of toluene was added for dilution. The diluted solution was then bubbled with nitrogen gas for 45 minutes. After the bubbling, 0.124 g (0.755 mmol) of AIBN was added to the resulting solution, which was further bubbled with nitrogen gas for 10 minutes. The solution was then heated to a temperature of 70° C. Polymerization was allowed to proceed for 24 hours during which the temperature of the solution was maintained at 70° C. After the polymerization, the resulting solution was added to a large volume of methanol to give a precipitate, which was purified. The resulting precipitate was collected by filtration and dried at 60° C. for 4 hours or more. The dried copolymer was a white solid and weighed 12.14 g (yield=97%).

To 11.01 g of the obtained copolymer (containing 10.2 mmol of a structure derived from 4VPA) was added 33 mL of methanol containing 1 mol/L of KOH (containing 33 mmol of KOH), followed by 33 mL of methanol and 33 mL of acetone. This copolymer slowly dissolved in the solution under stirring at room temperature. Concentrated hydrochloric acid was added to the solution containing the dissolved copolymer to neutralize the solution, which resulted in precipitation of a copolymer and a salt. The precipitates were collected by filtration, and the collected precipitates were dissolved in acetone. This solution was poured into a large volume of a mixture of water and methanol (water/methanol=1/1 (v/v)) to cause reprecipitation. The precipitated copolymer was collected and dried with a dryer at 60° C. for 24 hours. The dried copolymer was a white solid and weighed 9.85 g (yield=93%).

Example 1-4

An amount of 8.00 g of copolymer (containing 7.32 mmol of a structure derived from VPh) as obtained in Synthesis Example 1-4, 3.60 g (11.4 mmol) of bromobutylbutyldimethylammonium bromide, and 1.60 g (11.6 mmol) of $K_2CO_3$ were placed in a flask, and 50 mL of DMF was added to dissolve the copolymer. The resulting solution was then stirred at room temperature for 69 hours. The stirred solution was filtered to remove $K_2CO_3$, and the filtered solution was added to a large volume of ethyl acetate. The resulting precipitate was dissolved in ethanol. The resulting solution was poured into a large volume of water to precipitate a copolymer. The copolymer was collected by filtration and dried at 60° C. for 24 hours. The dried copolymer (ionomer resin) weighed 7.52 g (yield=77%). The amount of the ionomer resin soluble in 100 g of water at 25° C. was less than 0.01 g. The amount of the ionomer resin soluble in 100 g of a 5.31% aqueous potassium hydroxide solution at 25° C. was less than 0.01 g. The amount of the ionomer resin soluble in 100 g of ethanol at 25° C. was 2 g or more. The obtained ionomer resin was soluble also in DMSO and DMF.

Example 1-5

An amount of 0.49 g of copolymer (containing 1.4 mmol of a structure derived from VPh) obtained according to Synthesis Example 1-2 was dissolved in 5 mL of DMSO, and to the resulting solution was added 0.291 g (2.11 mmol) of $K_2CO_3$. Next, 0.491 g (2.86 mmol) of 1-bromo-4-chlorobutane was added at room temperature, and then the reaction was allowed to proceed at 40° C. for 40 hours. After $K_2CO_3$ was removed by filtration, the reaction solution was poured into a large volume of methanol to isolate a polymer. The polymer was collected by filtration and dried at 60° C. for 24 hours, giving 0.55 g (yield=95%) of the polymer in the form of a white solid.

Next, 1.41 g (13.9 mmol) of dimethylbutylamine was added to 0.42 g of the obtained polymer, which was then dissolved in 2.5 g of DMSO. The resulting solution was heated at 60° C. for 47 hours, after which the reaction solution was poured into a large volume of diethyl ether to isolate a polymer. The polymer was collected by filtration and dried at 60° C. for 24 hours, giving 0.44 g (yield=90%) of the polymer in the form of a white solid.

Synthesis Example 1-5

A flask was charged with 4VPA (2.01 g, 11.9 mmol) and a 2 mol/L aqueous KOH solution (23.8 mL, 47.6 mmol), which were stirred at room temperature for 3 hours. The resulting solution kept having two separate layers, the aqueous layer of which became orangish. Next, methylene chloride (23.8 mL) and tetrabutylammonium bromide (TBAB) (0.767 g, 2.38 mmol) were added to the solution, which was stirred at room temperature for 1.5 hours. Subsequently, 1-bromooctane (C8Br) (6.84 g, 35.4 mmol) was added to the solution, which was stirred at room temperature for 2 hours. The solution was then heated to a temperature of 40° C., and the reaction was allowed to proceed for 24 hours during which the temperature of the solution was maintained at 40° C. After that, the aqueous layer was extracted with methylene chloride. The extraction was repeated three times. The methylene chloride used in the extraction and the organic layer were combined. The combined organic layer was washed three times with distilled water. Magnesium sulfate was then added to dry the organic layer. Magnesium sulfate was removed by filtration, and the remaining C8Br was distilled off under reduced pressure. This was followed by purification using silica gel column chromatography (developing solvent: hexane) and then by pumping-up. Octyloxystyrene (C8) in the form of a colorless, transparent liquid was thus obtained in an amount of 2.40 g (10.3 mmol, yield=87%).

Synthesis Example 1-6

A two-necked flask was charged with St (4.04 g, 38.8 mmol), 4VPA (3.13 g, 19.3 mmol), C8 (1.50 g, 6.46 mmol)

as obtained in Synthesis Example 1-5, and toluene (8.5 mL), which were subjected to bubbling with nitrogen gas for 40 minutes. After that, AIBN (0.0529 g, 0.322 mmol) was added to the resulting solution, which was further bubbled with nitrogen gas for 10 minutes. The solution was then heated to a temperature of 70° C., and polymerization was allowed to proceed for 86 hours during which the temperature of the solution was maintained at 70° C. Next, the solution was cooled to room temperature and exposed to air to terminate the polymerization reaction. After that, the polymer solution was poured into a large volume of methanol to reprecipitate a polymer. The resulting precipitate was dried at 60° C. for 24 hours or more, giving 6.72 g (yield=96%) of the intended copolymer, poly(St-co-4VPA-co-C8), in the form of a white solid. The final molar ratio between monomer units contained in the copolymer was calculated as St:4VPA:C8=60:31:9 (the number of moles of the first structural unit was 0.3 times the sum of the number of moles of the first structural unit and the number of moles of the second structural unit) from the result of the $^1$H NMR measurement.

The obtained poly(St-co-4VPA-co-C8) (5.68 g (4VPA units: 2.14 g (13.2 mmol)) was added to a methanol solution containing 1 mol/L of KOH, and 20 mL of methanol and 20 mL of acetone were further added. The polymer fully dissolved after continuous stirring at room temperature for about 2 hours, and a transparent, homogeneous solution having a yellow color was obtained. It was confirmed by $^1$H NMR measurement that hydrolysis proceeded quantitatively. After that, the solution was neutralized by adding concentrated hydrochloric acid dropwise to the solution. Each time a drop of concentrated hydrochloric acid was added, a polymer precipitated and settled. When the neutralization point was reached, a white salt (KCl) precipitated. The neutralized solution was decanted to collect the settled precipitate, and acetone was added to the precipitate. The precipitate of KCl was removed by filtration, and the filtrate was poured into a large volume of a mixed solution containing water and methanol (water/methanol=3/2 in volume ratio) to reprecipitate a polymer. The precipitate was dried at 60° C. for 24 hours, giving 4.46 g (yield=87%) of poly(St-co-VPh-co-C8) in the form of a slightly yellowish solid.

Example 1-6

Poly(St-co-VPh-co-C8) (3.52 g, including 1.09 g (9.05 mmol) of VPh unit) as obtained in Synthesis Example 1-6 and bromobutylbutyldimethylammonium bromide (5.09 g, 16.1 mmol) were placed in a flask and were dissolved in 25 mL of DMSO. $K_2CO_3$ (1.85 g, 13.4 mmol) was then added to the solution, which was stirred at room temperature for 5 hours. The solution was then heated to a temperature of 40° C. and the reaction was allowed to proceed for 64 hours during which the temperature of the solution was maintained at 40° C. A precipitate of $K_2CO_3$ undissolved in DMSO was removed by filtration, and the reaction solution was poured into a large volume of ethyl acetate to precipitate a polymer. This polymer was then dissolved in methanol, and $K_2CO_3$ precipitated in the methanol was removed by filtration. The filtrate was poured into a large volume of pure water to reprecipitate a polymer. The polymer thus obtained was dried at 60° C. for 24 hours or more, giving 4.58 g (yield=92%) of the intended polymer in the form of a slightly yellowish solid. The amount of the polymer soluble in 100 g of water at 25° C. was less than 0.01 g. The amount of the polymer soluble in 100 g of a 5.31% aqueous potassium hydroxide solution at 25° C. was less than 0.01 g. The amount of the polymer soluble in 100 g of ethanol at 25° C. was 2 g or more.

Comparative Example 1-1

A 300-mL two-necked flask was charged with 21.3 g (139 mmol) of CMS, 0.752 g (4.58 mmol) of AIBN, and 80 mL of toluene, and the resulting solution was degassed by freeze-pump-thaw cycling to remove oxygen from the solution. After that, polymerization was allowed to proceed in a nitrogen atmosphere at 70° C. for 20 hours. After the reaction, the solution was poured into a large volume of methanol, and the resulting precipitate was collected by filtration. The collected precipitate was air-dried. Polychloromethylstyrene was thus obtained as a white solid weighing 16.9 g (yield=93%).

Next, 0.50 g of the obtained polychloromethylstyrene (containing 3.3 mmol of a structure derived from CMS) was dispersed in 2.0 mL of ethanol, and 3.3 mL of an ethanol solution containing 2 mol/L of dimethylbutylamine was added dropwise to the dispersion. The reaction was then allowed to proceed at room temperature for 24 hours. After the reaction, the resulting solution was transferred to and air-dried on a Petri dish and was then further dried at 60° C. for 24 hours. The ionomer resin obtained after the drying weighed 0.84 g (yield=100%).

The ionomer resin obtained in Comparative Example 1-1 was dissolved in ethanol to prepare an ethanol solution containing 2 wt % of the ionomer resin. An amount of 12.10 g of this ethanol solution, 0.969 g of an electrode catalyst, and 20 g of ethanol were mixed in the same manner as in Example 1-1 to prepare a catalyst electrode composition. The average particle diameter of the electrode catalyst dispersed in the obtained catalyst electrode composition was measured. The result is shown in Table 2. The electrode catalyst used was identical to that used in Example 1-1.

Synthesis Example 1-7

A 50-mL two-necked flask was charged with 4.76 g (29.3 mmol) of 4VPA, 0.0295 g (0.180 mmol) of AIBN, and 10 mL of toluene, and the resulting solution was degassed by freeze-pump-thaw cycling to remove oxygen from the solution. After that, polymerization was allowed to proceed in a nitrogen atmosphere at 70° C. for 24 hours. After the reaction, the resulting solution was poured into a large volume of methanol, and the resulting precipitate was collected by filtration. The collected precipitate was air-dried to obtain 6.16 g (crude yield=147%) of poly-4-vinylphenyl acetate in the form of a white solid. This polymer was subjected to the subsequent reaction without drying.

A volume of 105 mL of a methanol solution containing 1 mol/L of KOH (containing 105 mmol of KOH) was added dropwise at room temperature to the poly-4-vinylphenyl acetate obtained as above. The polymer quickly dissolved in the methanol solution containing KOH. The resulting solution was neutralized with concentrated hydrochloric acid, and the precipitated salt was removed by filtration. After the filtration, the filtrate was poured into a large volume of water to precipitate a polymer. The polymer was collected by filtration and dried under reduced pressure at 60° C. for 24 hours. Polyvinylphenol was thus obtained, and its weight was 2.47 g (yield=79%).

Comparative Example 1-2

An amount of 0.50 g of polyvinylphenol (containing 4.2 mmol of a structural unit derived from VPh) as obtained in Synthesis Example 1-7, 1.32 g (4.16 mmol) of bromobutyl-butyldimethylammonium bromide, and 0.773 g (5.59 mmol) of $K_2CO_3$ were placed in a flask and were dissolved by adding 10 mL of DMSO. The resulting solution was then stirred at room temperature for 150 hours. The stirred solution was then poured into a large volume of ethyl acetate to precipitate a polymer. The precipitated polymer was collected by filtration and dried at 60° C. for 24 hours. The dried polymer weighed 0.61 g (yield=48%). The amount of the polymer soluble in 100 g of water at 25° C. was 2 g or more, and the polymer was not usable as an ionomer resin for an anion-exchange fuel cell.

Comparative Example 1-3

A flask purged with nitrogen was charged with 0.511 g (4.25 mmol) of polyvinylphenol as obtained in Synthesis Example 1-7, 1.08 g (4.37 mmol) of bromoethyltrimethyl-ammonium bromide, and 0.788 g (5.70 mmol) of $K_2CO_3$, to which 15 mL of DMSO was further added. The resulting solution was stirred at room temperature for 89 hours. However, bromine atoms were eliminated from bromoethyltrimethylammonium bromide, and the intended product was not synthesized.

Synthesis Example 1-8

An amount of 360 g (4.47 mol) of chloromethyl methyl ether was diluted with 100 g of chloroform, and 40 g of styrene-ethylene-butylene-styrene copolymer (SEBS, composition ratio of styrene:butylene (all units other than styrene units were quantified as butylene units)=20:80 mol %, polystyrene-equivalent number-average molecular weight measured by gel permeation chromatography using THF as an eluent=90,000) was dissolved in the diluted solution. To the resulting solution was added 1.70 g (12.5 mmol) of zinc chloride, and the solution was heated at 40° C. for 1 hour to allow chloromethylation of SEBS to proceed. The reaction solution was poured into a mixed solution of methanol and water (methanol/water=1/1 wt) to terminate the reaction and precipitate a resin. The degree of chloromethylation as calculated using $^1H$ NMR was 59%.

Comparative Example 1-4

An amount of 40 g of the resin obtained in Synthesis Example 1-8 was dissolved in 700 g of toluene, and the solution was then air-dried to fabricate a cast membrane. This cast membrane was immersed in an acetone solution containing 25 wt % (125 g) of N,N-dimethylbutylamine at room temperature for 15 hours to allow quaternization to proceed. The quaternized cast membrane was washed with acetone for 30 minutes, then with a 1 mol/L solution of KOH for 30 minutes, and then with pure water for 1 hour. The amount of the polymer soluble in 100 g of water at 25° C. was less than 0.01 g. The amount of the polymer soluble in a 5.31% aqueous potassium hydroxide solution at 25° C. was less than 0.01 wt %, and the amount of the polymer soluble in 100 g of a mixed solvent of tetrahydrofuran and 1-propanol (tetrahydrofuran:1-propanol=7:3 in weight ratio) at 25° C. was 2 wt % or more.

The ionomer resin obtained in Comparative Example 1-4 was dissolved in a mixed solvent of tetrahydrofuran and 1-propanol (tetrahydrofuran:1-propanol=7:3 in weight ratio) to prepare an ionomer solution containing 2 wt % of the ionomer resin. An amount of 12.13 g of this ionomer solution, 0.967 g of an electrode catalyst, and 20 g of a mixed solvent of tetrahydrofuran and 1-propanol (tetrahydrofuran:1-propanol=7:3 in weight ratio) were mixed in the same manner as in Example 1-1 to prepare a catalyst electrode composition. The average particle diameter of the electrode catalyst dispersed in the obtained catalyst electrode composition was measured. The result is shown in Table 2. The electrode catalyst used was identical to that used in Example 1-1.

The results of alkali resistance evaluation (ion-exchange capacity and ion-exchange capacity retention) are shown in Table 1, and the average particle diameters in the catalyst electrode compositions are shown in Table 2. In Table 1, the values in "Ratio of number of moles of first structural unit" are those calculated using $^1H$ NMR. "Ratio of number of moles of first structural unit" refers to the ratio of the number of moles of the first structural unit to the sum of the number of moles of the first structural unit and the number of moles of the second structural unit ([(number of moles of first structural unit)/(number of moles of first structural unit+ number of moles of second structural unit)]).

TABLE 1

| | Ratio of number of moles of first structural unit | Time period of alkali resistance test (hours) | Initial ion-exchange capacity (mmol/g) | Ion-exchange capacity after alkali resistance test (mmol/g) | Ion-exchange capacity retention (%) |
|---|---|---|---|---|---|
| Example 1-1 | 0.5 | 1500 | 2.14 | 1.97 | 92 |
| Example 1-2 | 0.3 | 1500 | 1.24 | 1.18 | 95 |
| Example 1-3 | 0.2 | 1500 | 1.02 | 0.95 | 93 |
| Example 1-4 | 0.1 | 1500 | 0.74 | 0.70 | 94 |
| Example 1-5 | 0.3 | 1500 | 1.10 | 1.06 | 96 |
| Example 1-6 | 0.3 | 1500 | 1.26 | 1.21 | 96 |
| Comparative Example 1-1 | — | 1500 | 1.20 | 0.95 | 79 |
| Comparative Example 1-4 | — | 300 | 1.16 | 0.94 | 80 |

TABLE 2

| | Example 1-1 | Example 1-3 | Comparative Example 1-4 |
|---|---|---|---|
| Average particle diameter (μm) | 3.6 | 5.0 | 28.7 |

As seen from Table 2, the use of ionomer resins according to the present invention resulted in catalyst electrode compositions in which the average particle diameter of the electrode catalyst was small. It can be understood that, in the catalyst electrode compositions obtained in Examples 1-1 and 1-3, the electrode catalyst was uniformly dispersed without aggregation.

Comparative Example 2-1

A 25-μm-thick UHMWPE film was used as a polymer substrate to be included in the second layer. This UHMWPE film was exposed to electron radiation in a nitrogen atmosphere at room temperature. The electron radiation was applied to one side of the film at an accelerating voltage of 250 kV and a dose of 90 kGy. The electron-irradiated UHMWPE film was cooled with dry ice to the temperature of the dry ice and then stored before the subsequent step.

Next, 550 g of 4-(chloromethyl)styrene as a monomer was bubbled with nitrogen gas to remove oxygen from the monomer liquid. The electron-irradiated UHMWPE film was immersed in the monomer liquid for 30 minutes during which the temperature of the monomer liquid was maintained at 70° C., and thus graft polymerization was allowed to proceed. Next, the grafted film was taken out of the reaction solution, washed by immersion in toluene for 1 hour or more, and further washed with acetone for 30 minutes. After the washing, the grafted film was dried in a dryer at 60° C. The graft ratio of the resulting grafted membrane was 100%. Next, the grafted membrane was immersed in an ethanol solution of triethylamine (manufactured by Sigma-Aldrich Co., LLC., concentration=30 wt %) at room temperature for 12 hours to quaternize the chloromethyl moiety. The grafted membrane subjected to the quaternization was washed with ethanol for 30 minutes, then with an ethanol solution containing 1N hydrochloric acid for 30 minutes, and then with pure water. After the washing, the grafted membrane was immersed in a 1 mol/L aqueous KOH solution for 2 hours to allow ion exchange to take place, and then the membrane was washed with pure water. Subsequently, the membrane was subjected to bubbling with carbon dioxide gas in pure water for 30 minutes, giving an anion-exchange membrane having a carbonate ion-type quaternary ammonium salt group.

Example 2-1

A 200-mL two-necked flask equipped with a capacitor was charged with 5.01 g (30.9 mmol) of 4VPA and 12.93 g (124 mmol) of styrene, to which 20 mL of toluene was added for dilution. The diluted solution was then bubbled with nitrogen gas for 1 hour. To the resulting solution was added 0.124 g (0.755 mmol) of AIBN, and the solution was further bubbled with nitrogen gas for 15 minutes. The solution was then heated to a temperature of 70° C., and polymerization was allowed to proceed for 24 hours during which the temperature of the solution was maintained at 70° C. After the polymerization, the polymer solution was poured into a large volume of methanol to precipitate the polymer, and the polymer was purified. The precipitated polymer was collected by filtration and dried at 60° C. The resulting copolymer was a white solid and weighed 12.66 g (yield=94%).

To 9.84 g of the obtained copolymer (containing 15.8 mmol of 4VPA unit) were added 55 mL of a methanol solution containing 1 mol/L of KOH (containing 55 mmol of KOH), 50 mL of methanol, and 30 mL of acetone. The copolymer slowly dissolved in the solution under stirring at room temperature. Concentrated hydrochloric acid was added to the solution containing the dissolved copolymer to neutralize the solution, which resulted in precipitation of a copolymer and a salt. The solvent was replaced by acetone, and the resulting solution was poured into a large volume of a mixed solvent of water and methanol (water/methanol=1/1 v/v) to reprecipitate the copolymer. The precipitated copolymer was collected, and the collected copolymer was placed in an oven maintained at 60° C. and was dried for 24 hours. The dried copolymer was a white solid and weighed 7.18 g (yield=78%). An amount of 4.03 g of the obtained copolymer (containing 7.15 mmol of VPh unit), 3.52 g (11.1 mmol) of bromobutylbutyldimethylammonium bromide, and 1.66 g (12.0 mmol) of $K_2CO_3$ were placed in a flask, and 25 mL of DMSO and 25 mL of DMF were further added to dissolve the copolymer. The resulting solution was then stirred at room temperature for 24 hours. After $K_2CO_3$ was removed by filtration, the reaction solution was poured into a large volume of ethyl acetate to precipitate the reaction product. The reaction product thus obtained was dissolved in ethanol. The resulting solution was poured into a large volume of water to precipitate the reaction product. The precipitated reaction product was collected by filtration and dried at 60° C. for 24 hours. The dried reaction product weighed 4.27 g (yield=75%). This reaction product was insoluble in water but soluble in organic solvents such as alcohol, DMSO, and DMF.

The obtained reaction product was dissolved in ethanol to prepare a solution containing 2 wt % of the product. This solution was applied by spraying to the cathode-side principal surface of the anion-exchange membrane (second layer) obtained in Comparative Example 2-1. The spraying was followed by drying at 60° C. to produce a multilayer body having a first layer with a thickness of 4 μm.

The results of measurement of the functional group retention of the membranes obtained in Example and Comparative Example are shown in Table 3.

TABLE 3

| Sample | Functional group retention [%] |
|---|---|
| Example 2-1 | 41 |
| Comparative Example 2-1 | 3 |

The multilayer body obtained in Example 2-1 exhibited a higher functional group retention than the membrane obtained in Comparative Example 2-1, which means that in the multilayer body of Example 2-1, deterioration of the anion-exchange group at the cathode-side principal surface of the membrane was successfully reduced.

Reference Example 3-1

An ultrahigh molecular weight polyethylene powder (HI-ZEX MILLION 240M, manufactured by Mitsui Chemicals, Inc.) was charged into a mold, and compressed and preformed by applying a pressure of 100 kg/cm² at 25° C. for 10 minutes. The pressure was then reduced to 30 kg/cm², while the temperature was increased to 210° C. This state was maintained for 120 minutes to melt the ultrahigh molecular weight polyethylene powder. Next, the pressure was increased up to 100 kg/cm², and the temperature was gradually decreased to room temperature over 120 minutes during which the pressure was maintained at 100 kg/cm². After that, the resulting ultrahigh molecular weight polyethylene product was removed from the mold. Thus, a cylindrical molded product was obtained as a sintered block having an outer diameter of 80 mm, an inner diameter of 40 mm, and a length of 80 mm. Next, the molded product was spirally cut to obtain a 25-μm-thick skived film. This skived film is referred to as "film 3-1".

One side of the film 3-1 was exposed to electron radiation in a nitrogen atmosphere at an accelerating voltage of 250 kV and a dose of 90 kGy. The electron-irradiated film 3-1 was cooled with dry ice to the temperature of the dry ice and then stored before the subsequent step.

Next, 550 g of 4-(chloromethyl)styrene as a monomer was bubbled with nitrogen gas to remove oxygen from the monomer liquid. The electron-irradiated film 3-1 was immersed in the monomer liquid at 70° C. for 30 minutes to allow graft polymerization to proceed. Next, the grafted film was taken out of the reaction solution, washed by immersion in toluene for 1 hour or more, and further washed with acetone for 30 minutes. After that, the film was placed in a dryer set at 80° C. and thus dried to obtain a grafted membrane. The graft ratio of the obtained grafted membrane was 100%.

Next, the obtained grafted membrane was immersed in an ethanol solution of triethylamine (containing 30 wt % of triethylamine) at room temperature for 12 hours to quaternize the chloromethyl moiety. The grafted membrane subjected to the quaternization was washed with ethanol for 30 minutes, then with an ethanol solution containing 1N HCl for 30 minutes, and then with pure water. After that, the membrane was immersed in a 1 mol/L aqueous KOH solution for 2 hours to allow ion exchange to take place, and then the membrane was washed with pure water. Subsequently, the membrane was subjected to bubbling with carbon dioxide gas in pure water for 30 minutes, giving an anion-exchange membrane (second layer) having a carbonate ion-type quaternary ammonium salt group.

Example 3-1

A 200-mL two-necked flask equipped with a capacitor was charged with 5.01 g (30.9 mmol) of 4VPA and 12.93 g (124 mmol) of styrene, to which 20 mL of toluene was added for dilution. The diluted solution was then bubbled with nitrogen gas for 1 hour. To the resulting solution was added 0.124 g (0.755 mmol) of AIBN, and the solution was then further bubbled with nitrogen gas for 15 minutes. The solution was then heated to a temperature of 70° C., and polymerization was allowed to proceed for 24 hours during which the temperature of the solution was maintained at 70° C. After the polymerization, the polymer solution was poured into a large volume of methanol to precipitate the polymer, and the polymer was purified. The precipitated polymer was collected by filtration and dried at 60° C. The resulting copolymer was a white solid and weighed 12.66 g (yield=94%).

To 9.84 g of the obtained copolymer (containing 15.8 mmol of 4VPA unit) were added 55 mL of a methanol solution containing 1 mol/L of KOH (containing 55 mmol of KOH), 50 mL of methanol, and 30 mL of acetone. The copolymer slowly dissolved in the solution under stirring at room temperature. Concentrated hydrochloric acid was added to the solution containing the dissolved copolymer to neutralize the solution, which resulted in precipitation of a copolymer and a salt. The solvent was replaced by acetone, and the resulting solution was poured into a large volume of a mixed solvent of water and methanol (water/methanol=1/1 v/v) to reprecipitate the copolymer. The precipitated copolymer was collected, and the collected copolymer was placed in an oven maintained at 60° C. and was dried for 24 hours. The dried copolymer was a white solid and weighed 7.18 g (yield=78%). An amount of 4.03 g of the obtained copolymer (containing 7.15 mmol of VPh unit), 3.52 g (11.1 mmol) of bromobutylbutyldimethylammonium bromide, and 1.66 g (12.0 mmol) of $K_2CO_3$ were placed in a flask, and 25 mL of DMSO (dimethyl sulfoxide) and 25 mL of DMF (N,N-dimethylformamide) were further added to dissolve the copolymer. The resulting solution was then stirred at room temperature for 24 hours. After $K_2CO_3$ was removed by filtration, the reaction solution was poured into a large volume of ethyl acetate to precipitate the reaction product. The reaction product thus obtained was dissolved in ethanol. The resulting solution was poured into a large volume of water to precipitate the reaction product. The precipitated reaction product was collected by filtration and dried at 60° C. for 24 hours. The dried reaction product weighed 4.27 g (yield=75%). This reaction product was insoluble in water but soluble in organic solvents such as alcohol, DMSO, and DMF. The obtained reaction product was dissolved in ethanol to prepare a solution containing 2 wt % of the product, and this solution was used as a first layer-forming solution.

A commercially-available electrode containing platinum-carrying carbon was cut into a piece with a size of 20 mm×20 mm. The piece of the electrode was immersed in an ethylenediamine-ethanol mixture (ethylenediamine/ethanol=3/7 (wt %/wt %)) at room temperature for 12 hours or more, after which the piece of the electrode was air-dried (electrode-0). A principal surface of this electrode was sprayed with the first layer-forming solution, and the spraying was followed by drying at 60° C. for 10 minutes to produce a gas diffusion electrode (electrode-1) having a first layer. The thickness of the first layer was 4 μm. This electrode-1, the second layer (40 mm×40 mm) formed in Reference Example 3-1, and the electrode-0 were stacked in this order to form a MEA. In the MEA, a second principal surface of the first layer was in contact with a first principal surface of the second layer. This MEA was used as a test specimen for simulated durability test; specifically, the MEA was set in the testing cell for simulated durability test so that the electrode-1 served as the cathode, and in this state a simulated durability test was conducted. After the simulated durability test, the intensity of the peak attributed to the functional group was measured for the first principal surface of the second layer.

Comparative Example 3-1

A pair of electrodes-0 were prepared in the same manner as in Example 3-1. The second layer as obtained in Reference Example 3-1 was sandwiched between the pair of electrodes-0 to form a MEA, which was set in the testing cell for simulated durability test to conduct a simulated durability test. After the simulated durability test, the intensity of the peak attributed to the functional group was measured for the cathode-side principal surface of the second layer.

The results of measurement of the functional group retention of the membranes obtained in Example and Comparative Example are shown in Table 4.

TABLE 4

| Sample | Functional group retention [%] |
|---|---|
| Example 3-1 | 40 |
| Comparative Example 3-1 | 2 |

Example 3-1 yielded a higher functional group retention than Comparative Example 3-1, which means that in Example 3-1, deterioration of the anion-exchange group of the anion-exchange membrane was successfully reduced.

INDUSTRIAL APPLICABILITY

The ionomer resin according to the present invention can be used in an ionomer solution. The ionomer solution according to the present invention can be used in a catalyst electrode composition for a PEFC. The electrode catalyst composition according to the present invention can be used in a PEFC.

REFERENCE SIGNS LIST

1 Membrane-electrode assembly (MEA)
2 Multilayer body
3 Anode
4 Cathode
5 Anode separator
6 Cathode separator
7 First layer
8 Second layer
10 Polymer electrolyte fuel cell (PEFC)
11, 21 Gasket
11a, 21a Opening
12, 22 Separator
12a, 22a Flow path
13, 23 Current collecting plate
14, 24 End plate
18, 19, 28, 29 Flow path
20 Membrane for simulated durability test
100 Testing cell

The invention claimed is:

1. An ionomer solution comprising a solvent in which is dissolved an ionomer resin comprising a copolymer containing a first structural unit represented by the following formula (1):

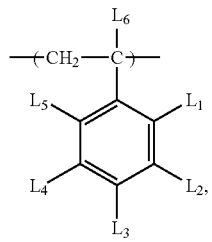
(1)

wherein
in the formula (1),
$L_1$ to $L_5$ are each independently a hydrogen atom, an alkyl group having 1 to 4 carbon atoms, an alkanol group having 1 to 4 carbon atoms, or a structure represented by the following formula (2-1) or (2-2):

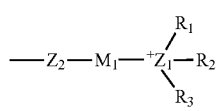
(2-1)

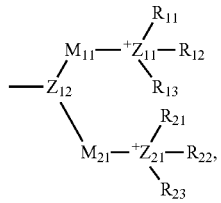
(2-2)

at least one of $L_1$ to $L_5$ is a structure represented by the formula (2-1) or (2-2), and
$L_6$ is a hydrogen atom, a methyl group, or an ethyl group, and
in the formulae (2-1) and (2-2),
$R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms,
$M_1$, $M_{11}$, and $M_{21}$ are each independently a linear hydrocarbon chain having 3 to 8 carbon atoms,
the hydrocarbon chain optionally has a substituent replacing a hydrogen atom bonded to a carbon atom of the hydrocarbon chain,
the substituent is at least one selected from the group consisting of a halogen atom and an alkyl group having 1 to 5 carbon atoms,
$Z_1$, $Z_{11}$, and $Z_{21}$ are each independently a nitrogen atom or a phosphorus atom,
$Z_2$ is a nitrogen atom bonded to one hydrogen atom, an oxygen atom, or a sulfur atom, and
$Z_{12}$ is a nitrogen atom.

2. An ionomer solution comprising the ionomer resin according to claim 1, wherein the copolymer is devoid of a crosslinked structure.

3. The ionomer solution according to claim 1, wherein the copolymer further contains a second structural unit represented by the following formula (3):

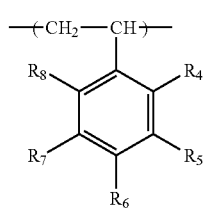
(3)

the number of moles of the first structural unit is in the range of 0.01 to 0.7 times a sum of the number of moles of the first structural unit and the number of moles of the second structural unit, and
in the formula (3), $R_4$ to $R_8$ are each independently a hydrogen atom, a halogen atom, an alkyl or alkoxy group having 1 to 14 carbon atoms, or a halogenated alkyl group having 1 to 4 carbon atoms.

4. A multilayer body comprising two or more layers, wherein
the layers include
a first layer containing an ionomer resin, and
a second layer that has an anion-exchange polymer electrolyte membrane,
the first layer is stacked on the second layer, and
the ionomer resin comprises a copolymer containing a first structural unit represented by the following formula (1):

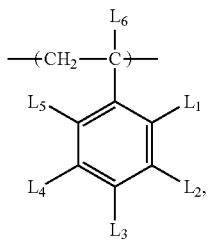

(1)

wherein
in the formula (1),
$L_1$ to $L_5$ are each independently a hydrogen atom, an alkyl group having 1 to 4 carbon atoms, an alkanol group having 1 to 4 carbon atoms, or a structure represented by the following formula (2-1) or (2-2):

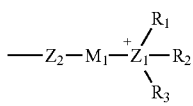

(2-1)

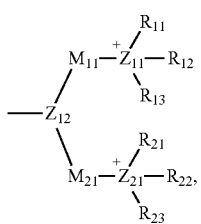

(2-2)

at least one of $L_1$ to $L_5$ is a structure represented by the formula (2-1) or (2-2), and
$L_6$ is a hydrogen atom, a methyl group, or an ethyl group, and
in the formulae (2-1) and (2-2),
$R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms,
$M_1$, $M_{11}$, and $M_{21}$ are each independently a linear hydrocarbon chain having 3 to 8 carbon atoms,
the hydrocarbon chain optionally has a substituent replacing a hydrogen atom bonded to a carbon atom of the hydrocarbon chain,
the substituent is at least one selected from the group consisting of a halogen atom and an alkyl group having 1 to 5 carbon atoms,
$Z_1$, $Z_{11}$, and $Z_{21}$ are each independently a nitrogen atom or a phosphorus atom,
$Z_2$ is a nitrogen atom bonded to one hydrogen atom, an oxygen atom, or a sulfur atom, and
$Z_{12}$ is a nitrogen atom.

5. The multilayer body according to claim 4, wherein the anion-exchange polymer electrolyte membrane has a polymer substrate and a graft chain, and the graft chain has a functional group having anionic conductivity.

6. An electrochemical element comprising an anode, a cathode, and a multilayer body comprising an anion-exchange polymer electrolyte membrane, wherein the multilayer body is the multilayer body according to claim 4, and the multilayer body is sandwiched between the anode and the cathode.

7. An electrochemical device comprising the electrochemical element according to claim 6.

8. A multilayer body comprising two or more layers, wherein
the layers include
a first layer containing an ionomer resin, and
a catalyst layer,
the first layer is stacked on the catalyst layer, and
the ionomer resin comprises a copolymer containing a first structural unit represented by the following formula (1):

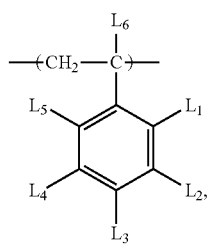

(1)

wherein
in the formula (1),
$L_1$ to $L_5$ are each independently a hydrogen atom, an alkyl group having 1 to 4 carbon atoms, an alkanol group having 1 to 4 carbon atoms, or a structure represented by the following formula (2-1) or (2-2):

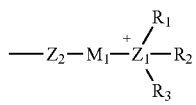

(2-1)

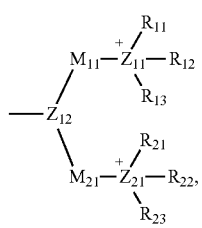

(2-2)

at least one of $L_1$ to $L_5$ is a structure represented by the formula (2-1) or (2-2), and
$L_6$ is a hydrogen atom, a methyl group, or an ethyl group, and
in the formulae (2-1) and (2-2),
$R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms,
$M_1$, $M_{11}$, and $M_{21}$ are each independently a linear hydrocarbon chain having 3 to 8 carbon atoms,
the hydrocarbon chain optionally has a substituent replacing a hydrogen atom bonded to a carbon atom of the hydrocarbon chain,
the substituent is at least one selected from the group consisting of a halogen atom and an alkyl group having 1 to 5 carbon atoms,
$Z_1$, $Z_{11}$, and $Z_{21}$ are each independently a nitrogen atom or a phosphorus atom, $Z_2$ is a nitrogen atom bonded to one hydrogen atom, an oxygen atom, or a sulfur atom, and $Z_{12}$ is a nitrogen atom.

9. A member for an electrochemical element, the member comprising the multilayer body according to claim 8 and a base material, wherein the base material, the catalyst layer, and the first layer are stacked in this order.

10. An electrochemical element comprising an anion-exchange polymer electrolyte membrane and an electrode, wherein a principal surface of the anion-exchange polymer electrolyte membrane is in contact with a principal surface of the electrode, and the electrode contains an ionomer resin comprising a copolymer containing a first structural unit represented by the following formula (1):

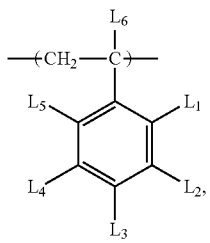

wherein in the formula (1), $L_1$ to $L_5$ are each independently a hydrogen atom, an alkyl group having 1 to 4 carbon atoms, an alkanol group having 1 to 4 carbon atoms, or a structure represented by the following formula (2-1) or (2-2):

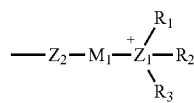

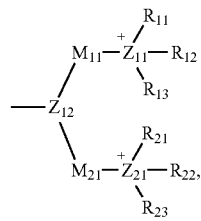

at least one of $L_1$ to $L_5$ is a structure represented by the formula (2-1) or (2-2), and $L_6$ is a hydrogen atom, a methyl group, or an ethyl group, and in the formulae (2-1) and (2-2), $R_1$ to $R_3$, $R_{11}$ to $R_{13}$, and $R_{21}$ to $R_{23}$ are each independently an alkyl group having 1 to 8 carbon atoms or an alkanol group having 1 to 8 carbon atoms, $M_1$, $M_{11}$, and $M_{21}$ are each independently a linear hydrocarbon chain having 3 to 8 carbon atoms, the hydrocarbon chain optionally has a substituent replacing a hydrogen atom bonded to a carbon atom of the hydrocarbon chain, the substituent is at least one selected from the group consisting of a halogen atom and an alkyl group having 1 to 5 carbon atoms, $Z_1$, $Z_{11}$, and $Z_{21}$ are each independently a nitrogen atom or a phosphorus atom, $Z_2$ is a nitrogen atom bonded to one hydrogen atom, an oxygen atom, or a sulfur atom, and $Z_{12}$ is a nitrogen atom.

11. An electrochemical device comprising the electrochemical element according to claim 10.

* * * * *